(12) United States Patent
Togashi

(10) Patent No.: US 7,085,124 B2
(45) Date of Patent: Aug. 1, 2006

(54) MULTILAYER CAPACITOR

(75) Inventor: Masaaki Togashi, Nikaho (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/272,706

(22) Filed: Nov. 15, 2005

(65) Prior Publication Data
US 2006/0120017 A1 Jun. 8, 2006

(30) Foreign Application Priority Data
Nov. 18, 2004 (JP) ............................ P2004-334935

(51) Int. Cl.
H01G 4/005 (2006.01)
H01G 4/228 (2006.01)

(52) U.S. Cl. ..................................... 361/303; 361/309
(58) Field of Classification Search ........ 361/303–305, 361/306.3, 308.1, 309, 311
See application file for complete search history.

(56) References Cited

U.S. PATENT DOCUMENTS

| | | | |
|---|---|---|---|
| 5,450,278 A * | 9/1995 | Lee et al. .................... | 361/303 |
| 6,433,995 B1 * | 8/2002 | Nakagawa et al. .......... | 361/311 |
| 6,577,491 B1 * | 6/2003 | Ohtsuka et al. ........... | 361/306.3 |
| 6,621,682 B1 * | 9/2003 | Takakuwa et al. ........ | 361/306.3 |
| 6,922,329 B1 * | 7/2005 | Togashi ...................... | 361/309 |

FOREIGN PATENT DOCUMENTS

JP 10316919 A * 12/1998
JP A 2000-299249 10/2000

* cited by examiner

Primary Examiner—Eric W. Thomas
(74) Attorney, Agent, or Firm—Oliff & Berridge, PLC

(57) ABSTRACT

The multilayer capacitor comprises a multilayer body and first and second terminal electrodes disposed on side faces of the multilayer body. The multilayer body is formed by alternately laminating a first internal electrode layer and a second internal electrode layer, with a dielectric layer interposed. The first internal electrode layer has a first internal electrode which extends so as to be extracted to a first side face, and a second internal electrode which extends so as to be extracted to a third side face. The second internal electrode layer has a third internal electrode which extends so as to be extracted to a second side face and a fourth internal electrode which extends so as to be extracted to a fourth side face. A first capacitance component is formed by the second internal electrode and the fourth internal electrode. A second capacitance component is formed by the first internal electrode and the fourth internal electrode. A third capacitance component is formed by the second internal electrode and the third internal electrode.

5 Claims, 24 Drawing Sheets and is connected to the first and second terminal electrodes; and a second internal electrode layer comprises a third internal electrode which extends so as to be extracted to the second side face and is connected to the second terminal electrode, and a fourth internal electrode, electrically insulated from the third internal electrode, which extends so as to be extracted to the fourth side face and is connected to the fourth terminal electrode; wherein a first capacitance component being formed by the second internal electrode and the fourth internal electrode; wherein a second capacitance component being formed by the first internal electrode and the fourth internal electrode; and wherein a third capacitance component being formed by the second internal electrode and the third internal electrode.

MULTILAYER CAPACITOR

BACKGROUND OF THE INVENTION

1. Field of the Invention

The present invention relates to a multilayer capacitor.

2. Related Background Art

Multilayer capacitors of this kind are known, which comprise a multilayer body in which dielectric layers and a plurality of internal electrodes are laminated alternately, and a pair of terminal electrodes and a pair of earth electrodes formed on the outer surface of the multilayer body, first to third capacitance components being formed by the plurality of internal electrodes (see, for example, Japanese Patent Application Publication No. 2000-299249). The first capacitance component is disposed between the pair of terminal electrodes. The second and third capacitance components are disposed respectively in parallel with the first capacitance component, and are mutually connected in series, as well as being connected to earth electrodes at junction points.

The multilayer capacitor disclosed in Japanese Patent Application Publication No. 2000-299249 comprises first to fourth internal electrodes as the plurality of internal electrodes. In this case, the second and third capacitance components are formed by laminating a pair of first internal electrodes and a second internal electrode. The pair of first internal electrodes are formed by dividing the same laminated surface into two parts at the central part thereof. The second internal electrode extends in a continuous fashion, and opposes the first internal electrodes with a dielectric layer interposed. The first capacitance component is created by laminating a third internal electrode and fourth internal electrode. The third internal electrode extends in a continuous fashion, and opposes the second internal electrode with a dielectric layer interposed. The fourth internal electrode extends in a continuous fashion, and opposes the third internal electrode with a dielectric layer interposed.

SUMMARY OF THE INVENTION

However, since the multilayer capacitor disclosed in Japanese Patent Application Publication No. 2000-299249 is composed by respectively laminating first to fourth internal electrodes with each of dielectric layers interposed, then it is necessary to create four types of internal electrodes, namely, the first to fourth internal electrodes, in order to create the first to third capacitance components. Therefore, the manufacturing process for the multilayer capacitor becomes complicated, and the manufacturing costs increase.

It is an object of the present invention to provide a multilayer capacitor which can be manufactured readily, and which enables manufacturing costs to be reduced.

The multilayer capacitor according to the present invention is a multilayer capacitor, comprising: a multilayer body in which a first internal electrode layer and a second internal electrode layer are laminated alternately with a dielectric layer interposed; a first terminal electrode disposed on a first side face of the multilayer body parallel to a laminating direction in which the first and second internal electrode layers are laminated; a second terminal electrode disposed on a second side face of the multilayer body opposing the first side face; a third terminal electrode disposed on a third side face of the multilayer body, which is parallel to the laminating direction and extends in a direction, that intersects with the first and second side faces; and a fourth terminal electrode disposed on a fourth side face of the multilayer body opposing the third side face; wherein the first internal electrode layer comprises a first internal electrode which extends so as to be extracted to the first side face and is connected to the first terminal electrode, and a second internal electrode, electrically insulated from the first internal electrode, which extends so as to be extracted to the third side face and is connected to the third terminal electrode; wherein the second internal electrode layer comprises a third internal electrode which extends so as to be extracted to the second side face and is connected to the second terminal electrode, and a fourth internal electrode, electrically insulated from the third internal electrode, which extends so as to be extracted to the fourth side face and is connected to the fourth terminal electrode; wherein a first capacitance component being formed by the second internal electrode and the fourth internal electrode; wherein a second capacitance component being formed by the first internal electrode and the fourth internal electrode; and wherein a third capacitance component being formed by the second internal electrode and the third internal electrode.

In the multilayer capacitor according to the present invention, first to third capacitance components are formed by laminating a first internal electrode layer and a second internal electrode layer with a dielectric layer interposed. Consequently, in order to form the first to third capacitance components, it is sufficient to form two types of internal electrode layers, namely, the first and second internal electrode layers. Therefore, it is possible to manufacture a multilayer capacitor having three capacitance components, readily, and hence reduction of manufacturing costs can be achieved.

The first internal electrode of the first internal electrode layer also extends so as to be extracted to the second side face and is electrically connected to the second terminal electrode; and wherein the third internal electrode of the second internal electrode layer also extends so as to be extracted to the first side face and is electrically connected to the first terminal electrode.

In this case, desirably, the respective both end portions of the first and third internal electrodes in an opposing direction in which the first side face and the second side face oppose each other are set to have a broader width in a direction perpendicular to the laminating direction and the opposing direction than the respective intermediate portions of the first and third internal electrodes in the opposing direction. By setting the width in this manner, it is possible to achieve reliable electrical connections between the first internal electrode and the first and second terminal electrodes and between the third internal electrode and the first and second terminal electrodes.

The multilayer capacitor according to the present invention is a multilayer capacitor, comprising: a multilayer body in which a first internal electrode layer and a second internal electrode layer are laminated alternately with a dielectric layer interposed; a first terminal electrode disposed on a first side face of the multilayer body parallel to a laminating direction in which the first and second internal electrode layers are laminated; a second terminal electrode disposed on a second side face of the multilayer body opposing the first side face; a third terminal electrode disposed on a third side face of the multilayer body, which is parallel to the laminating direction and extends in a direction that intersects with the first and second side faces; and a fourth terminal electrode disposed on a fourth side face of the multilayer body opposing the third side face; wherein the first internal electrode layer comprises a first internal electrode which extends so as to be extracted to the first and second side faces and is connected to the first and second terminal electrodes, and a second internal electrode, electrically insulated from the first internal electrode, which extends so as to be extracted to the third side face and is connected to the third terminal electrode; wherein the second internal electrode layer comprises a third internal electrode which extends so as to be extracted to the first and second side faces and is connected to the first and second terminal electrodes, and a fourth internal electrode, electrically insulated from the third internal electrode, which extends so as to be extracted to the fourth side face and is connected to the fourth terminal electrode; wherein a first capacitance component being formed by the second internal electrode and the fourth internal electrode; wherein a second capacitance component being formed by the first internal electrode and the fourth internal electrode; and wherein a third capacitance component being formed by the second internal electrode and the third internal electrode.

In the multilayer capacitor according to the present invention, first to third capacitance components are formed by laminating a first internal electrode layer and a second internal electrode layer with a dielectric layer interposed. Consequently, in order to form the first to third capacitance components, it is sufficient to form two types of internal electrode layers, namely, the first and second internal electrode layers. Therefore, it is possible to manufacture a multilayer capacitor having three capacitance components, readily, and hence reduction of manufacturing costs can be achieved.

In this case, desirably, the respective both end portions of the first and third internal electrodes in an opposing direction in which the first side face and the second side face oppose each other are set to have a broader width in a direction perpendicular to the laminating direction and the opposing direction than the respective intermediate portions of the first and third internal electrodes in the opposing direction. By setting the width in this manner, it is possible to achieve reliable electrical connections between the first internal electrode and the first and second terminal electrodes and between the third internal electrode and the first and second terminal electrodes.

According to the present invention, it is possible to provide a multilayer capacitor which can be manufactured readily and enables manufacturing costs to be reduced.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
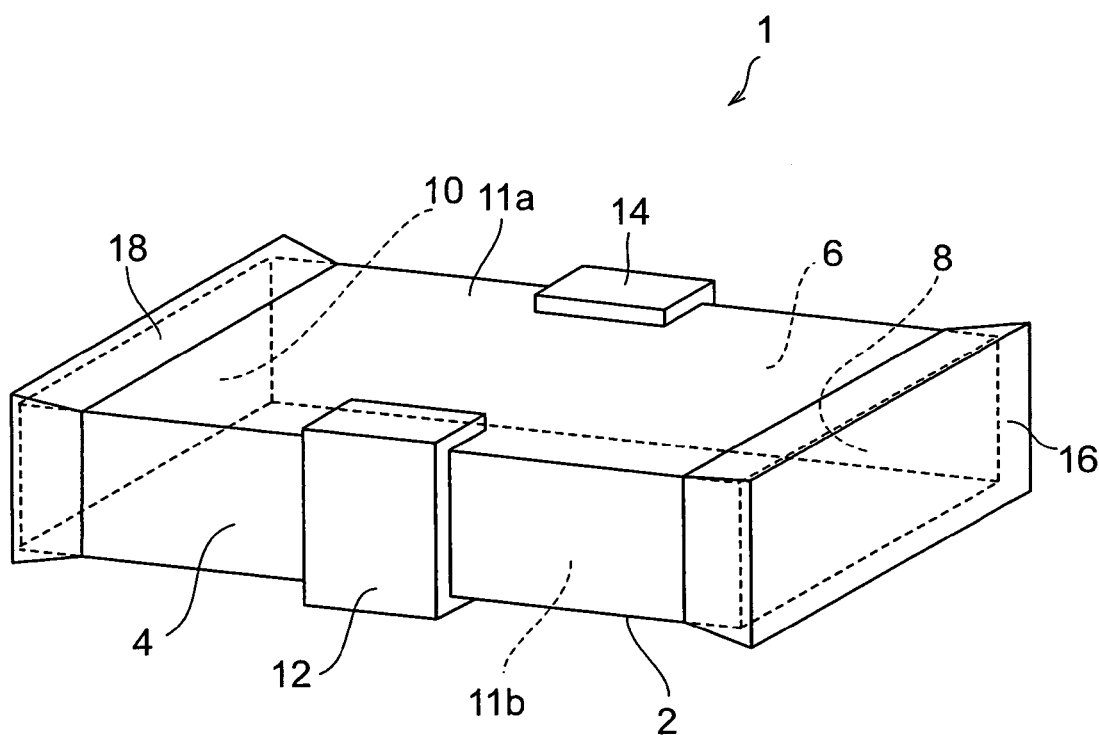
FIG. 1 is an oblique perspective diagram of a multilayer capacitor according to a first embodiment of the present invention.
Figure 1:
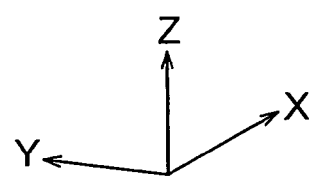

Below, preferred embodiments of multilayer capacitors relating to the present invention are described in detail with reference to the accompanying drawings. In this explanation, the same reference numerals are used for the same elements or elements having the same function, and duplicated description is omitted.

First Embodiment

Figure 2:
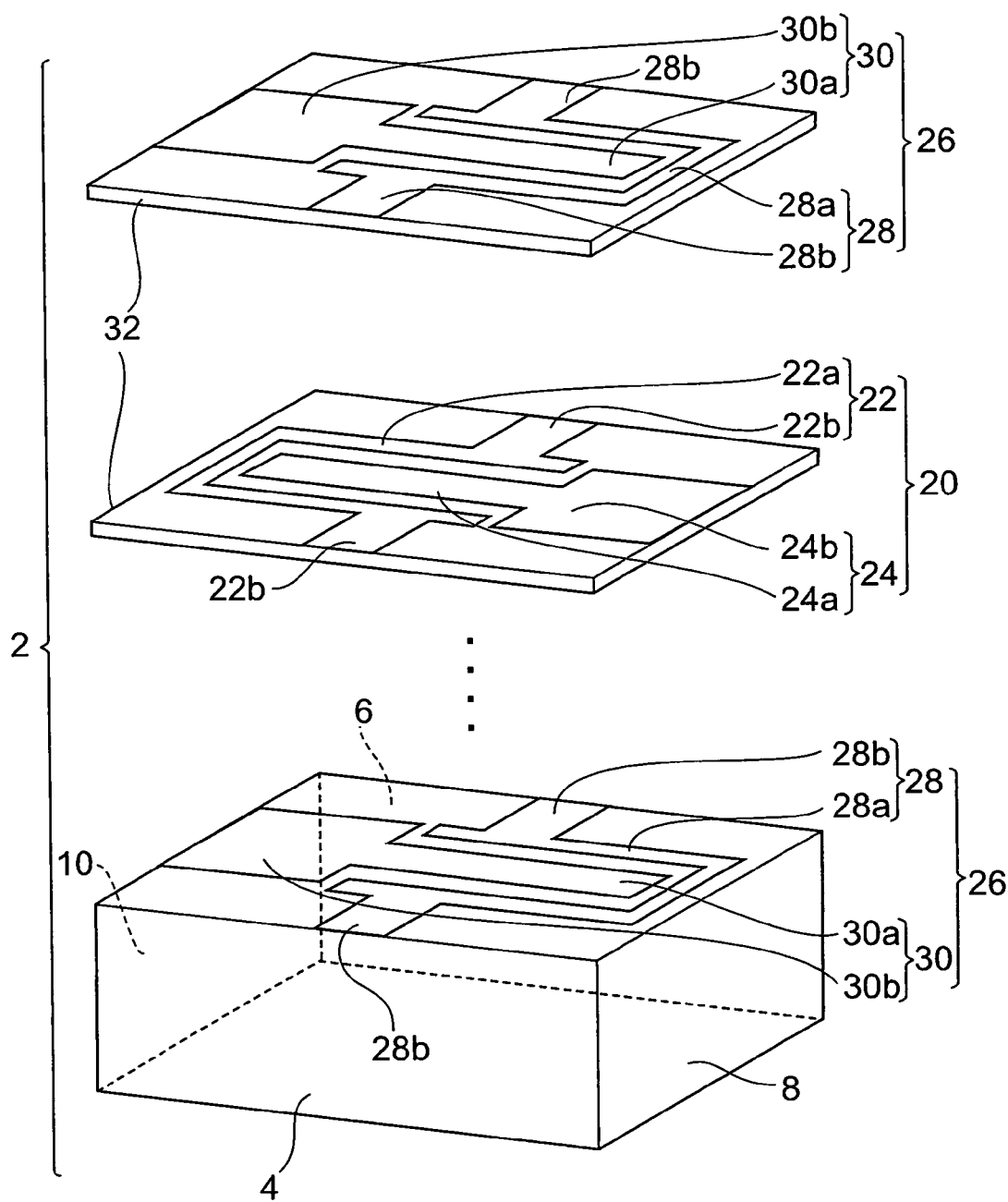
FIG. 2 is an exploded oblique perspective diagram showing a multilayer body included in the multilayer capacitor according to the first embodiment.
Figure 3:
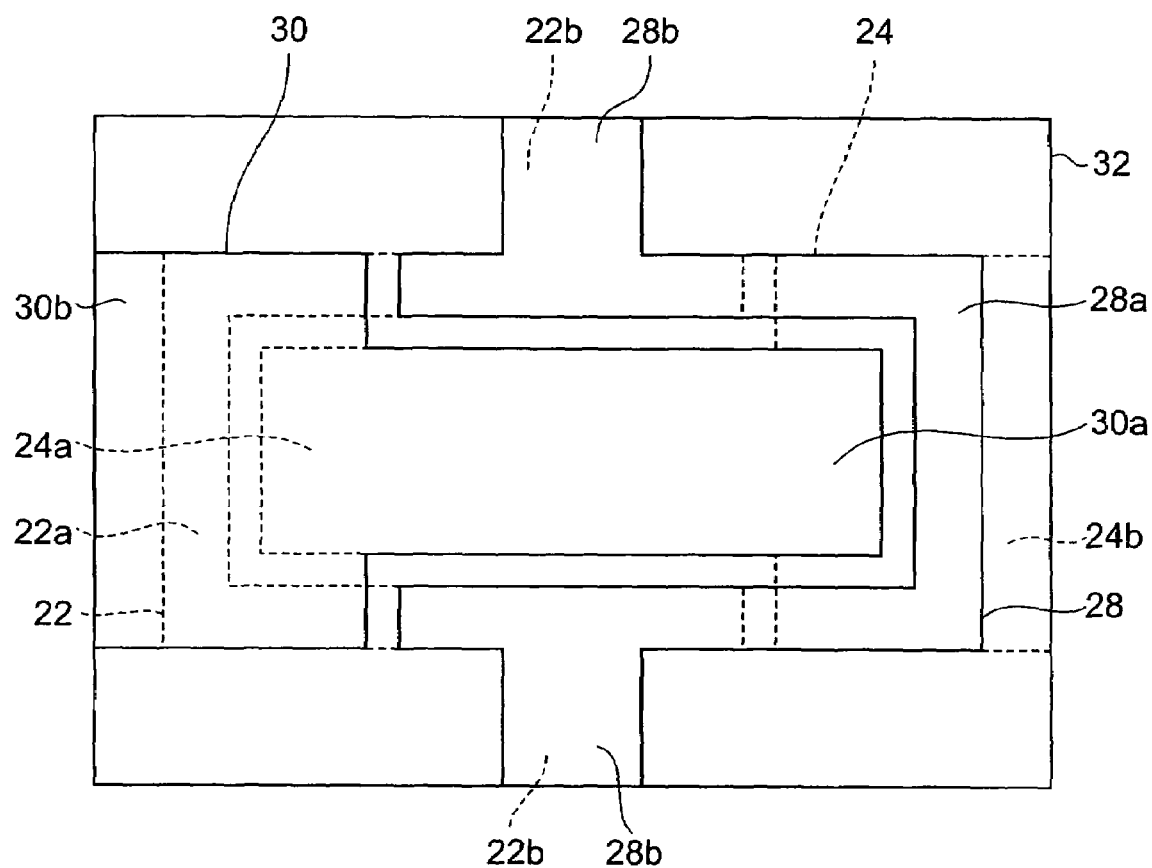
FIG. 3 is a plan diagram of a state where a first internal electrode layer and a second internal electrode layer included in the multilayer capacitor according to the first embodiment are mutually superimposed.
Figure 4:
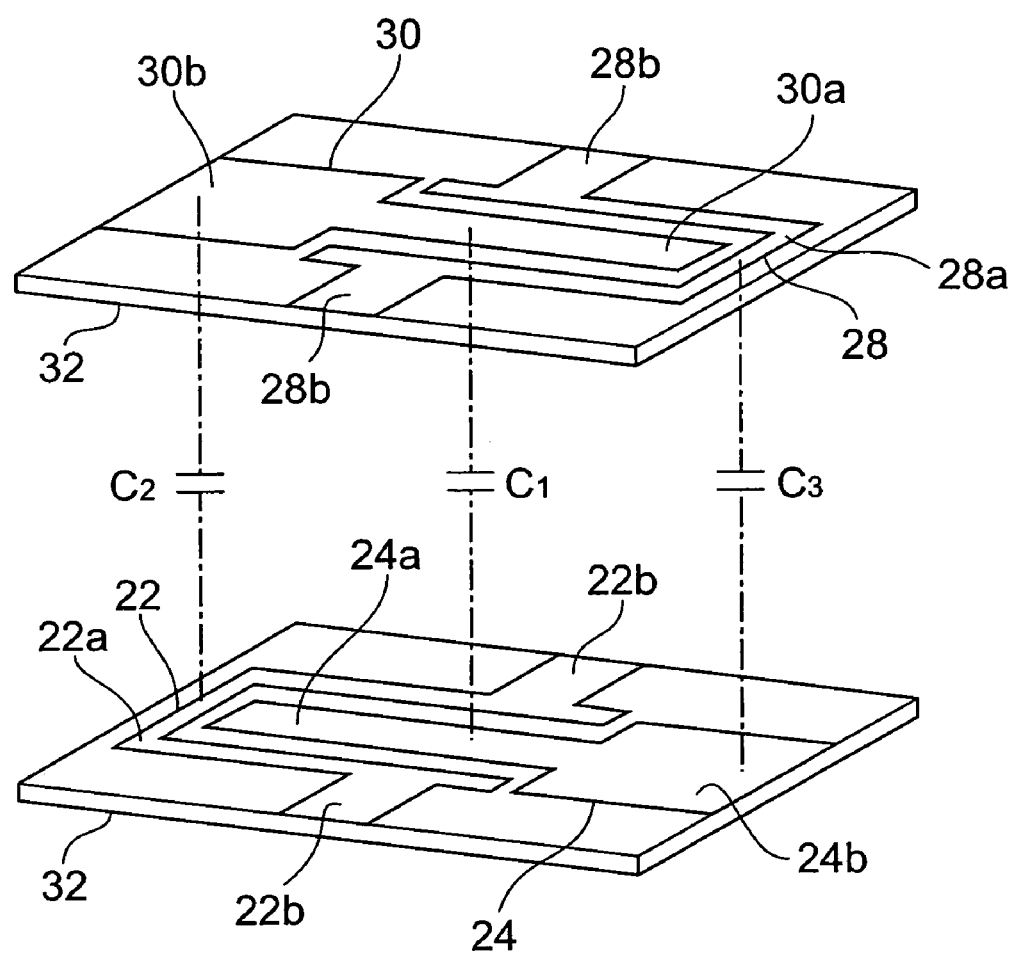
FIG. 4 is a diagram for describing the capacitance components formed by superimposition of the first internal electrode layer and the second internal electrode layer included in the multilayer capacitor according to the first embodiment.
Figure 5:
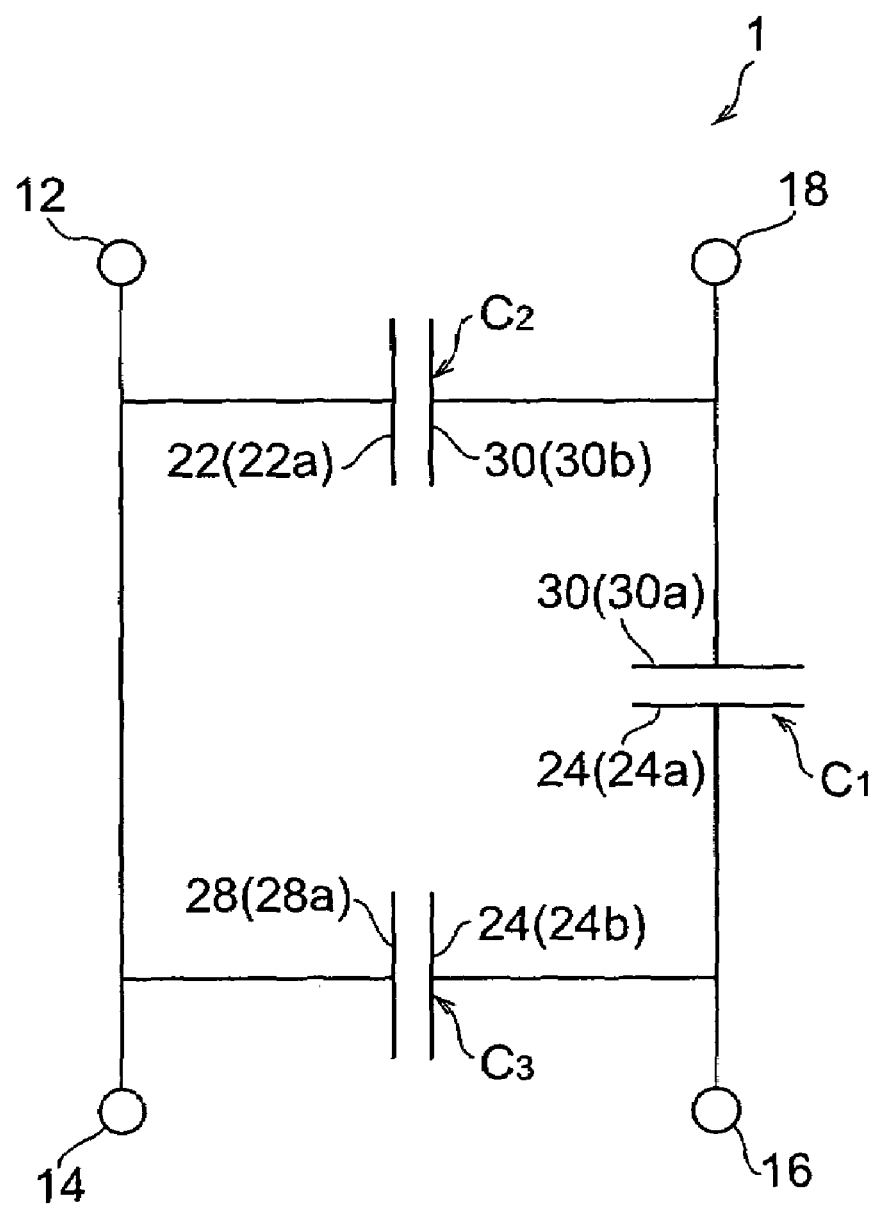
FIG. 5 is an equivalent circuit diagram of the multilayer capacitor relating to the first embodiment.

Firstly, the composition of a multilayer capacitor 1 relating to a first embodiment will now be described on the basis of FIG. 1 to FIG. 5. FIG. 1 is an oblique perspective diagram of a multilayer capacitor relating to the first embodiment. FIG. 2 is an exploded oblique perspective diagram showing a multilayer body included in the multilayer capacitor relating to the first embodiment. A portion of the multilayer body is shown exploded in FIG. 2. FIG. 3 is a plan diagram of a state where the first internal electrode layer and the second internal electrode layer included in the multilayer capacitor according to the first embodiment are mutually superimposed. FIG. 4 is a diagram for describing the capacitance components formed by superimposition of the first internal electrode layer and the second internal electrode layer included in the multilayer capacitor according to the first embodiment. FIG. 5 is an equivalent circuit diagram of the multilayer capacitor relating to the first embodiment.

As shown in FIG. 1, the multilayer capacitor 1 comprises a rectangular parallelepiped shaped multilayer body 2, and first to fourth terminal electrodes 12, 14, 16 and 18. As shown in FIG. 2, the multilayer body 2 comprises first internal electrode layers 20 and second internal electrode layers 26, which are laminated alternately with a dielectric layer 32 interposed respectively. The actual multilayer capacitor 1 is integrated into a single body, in such a manner that boundaries between the dielectric layers 32 are not distinguishable.

As shown in FIG. 1, the multilayer body 2 has a first side face 4, a second side face 6, a third side face 8, a fourth side face 10, a fifth side face 11a, and a sixth side face 11b. The first side face 4 and the second side face 6 are disposed in such a manner that they oppose each other when viewed in the direction of the X axis. The third side face 8 and the fourth side face 10 are disposed in such a manner that they oppose each other when viewed in the direction of the Y axis. Consequently, the third side face 8 and the fourth side face 10 extend respectively in a direction that intersects with the first and second side faces 4, 6. The fifth side face 11a and the sixth side face 11b are disposed in such a manner that they oppose each other when viewed in the direction of the Z axis.

As shown in FIG. 2, each of the first to fourth side faces 4, 6, 8 and 10 lies in parallel with the Z axis direction, in other words, the laminating direction in which the first internal electrode layers 20 and the second internal electrode layers 26 are laminated (hereinafter, simply called the "laminating direction").

A first terminal electrode 12 is disposed on the first side face 4 of the multilayer body 2. The first terminal electrode 12 is formed in such a manner that it covers the central portion of the first side face 4 in the Y axis direction, in other words, the opposing direction in which the third side face 8 and the fourth side face 10 oppose each other, while a portion thereof wraps over parts of, the fifth and sixth side faces 11a and 11b. A second terminal electrode 14 is disposed on the second side face 6 of the multilayer body 2. The second terminal electrode 14 is formed in such a manner that it covers the central portion of the second side face 6 in the Y axis direction, in other words, the opposing direction in which the third side face 8 and the fourth side face 10 oppose each other, while a portion thereof wraps over parts of the fifth and sixth side faces 11a and 11b.

A third terminal electrode 16 is disposed on the third side face 8 of the multilayer body 2. The third terminal electrode 16 is formed in such a manner that it covers the third side face 8, while a portion thereof wraps over the first, second, fifth and sixth side faces 4, 6, 11a and 11b. A fourth terminal electrode 18 is disposed on the fourth side face 10 of the multilayer body 2. The fourth terminal electrode 18 is formed in such a manner that it covers the fourth side face 10, while a portion thereof wraps over the first, second, fifth and sixth side faces 4, 6, 11a and 11b.

The first and second terminals electrodes 12 and 14, and the third and fourth terminal electrodes 16 and 18, have prescribed intervals therebetween respectively and are electrically insulated. The first terminal electrode 12 and the second terminal electrode 14 have a prescribed interval therebetween and are electrically insulated. The third terminal electrode 16 and the fourth terminal electrode 18 have a prescribed interval therebetween and are electrically insulated.

As shown in FIG. 2, each of the first internal electrode layers 20 includes a first internal electrode 22 and a second internal electrode 24. The first internal electrode 22 and the second internal electrode 24 are positioned in the same layer in a state of electrical insulation with respect to each other. The first internal electrode 22 is connected to the first terminal electrode 12 and the second terminal electrode 14. The second internal electrode 24 is connected to the third terminal electrode 16.

The first internal electrode 22 extends in the opposing direction in which the first side face 4 and the second side face 6 oppose each other, in such a manner that it is extracted to the first side face 4 and the second side face 6. The first internal electrode 22 comprises a first electrode portion 22a and second electrode portions 22b. The first electrode portion 22a corresponds to the intermediate portion of the first internal electrode 22 in the opposing direction in which the first side face 4 and the second side face 6 oppose each other. The second electrode portions 22b correspond to the both end portions of the first internal electrode 22 in the opposing direction in which the first side face 4 and the second side face 6 oppose each other.

The first electrode portion 22a includes first region and second regions. The first region is a region which extends in the opposing direction in which the first side face 4 and the second side face 6 oppose each other, in line with the fourth side face 10 and at a prescribed interval from the fourth side face 10. Each of the second regions is a region which extends from either end of the first region, in the opposing direction in which the third side face 8 and the fourth side face 10 oppose each other. The respective second electrode portions 22b extend from the first electrode portion 22a in such a manner that it is extracted to the first and second side faces 4 and 6. The second electrode portions 22b are set so as to have a broader width in the direction perpendicular to the laminating direction and the opposing direction in which the first side face 4 and the second side face 6 oppose each other (in other words, the opposing direction in which the third side face 8 and the fourth side face 10 oppose each other), compared to the first electrode portion 22a. One of the second electrode portion 22b is connected to the first terminal electrode 12 and the other 22b to the second terminal electrode 14.

The second internal electrode 24 extends in such a manner that it is extracted to the third side face 8. The second internal electrode 24 comprises a first electrode portion 24a and a second electrode portion 24b. The first electrode portion 24a is positioned in a region surrounded by the first internal electrode 22, and it has a rectangular shape. The second electrode portion 24b extends from the first electrode portion 24a toward the central portion of the third side face 8 in the opposing direction in which first side face 4 and the second side face 6 oppose each other, in such a manner that it borders the third side face 8. The second electrode portion 24b is connected to the third terminal electrode 16.

As shown in FIG. 2, each of the second internal electrode layers 26 includes a third internal electrode 28 and a fourth internal electrode 30. The third internal electrode 28 and the fourth internal electrode 30 are positioned in the same layer, in a state of electrical insulation with respect to each other. The third internal electrode 28 is connected to the first terminal electrode 12 and the second terminal electrode 14. The fourth internal electrode 30 is connected to the fourth terminal electrode 18.

The third internal electrode 28 extends in the opposing direction in which the first side face 4 and the second side face 6 oppose each other in such a manner that it is extracted to the first side face 4 and the second side face 6. The third internal electrode 28 comprises a first electrode portion 28a and second electrode portions 28b. The first electrode portion 28a corresponds to the intermediate portion of the third internal electrode 28 in the opposing direction in which the first side face 4 and the second side face 6 oppose each other. The second electrode portions 28b correspond to the both end portions of the third internal electrode 28 in the opposing direction in which the first side face 4 and the second side face 6 oppose each other.

The first electrode portion 28a includes first region and second regions. The first region extends in the opposing direction in which the first side face 4 and the second side face 6 oppose each other, in line with the third side face 8, and having a prescribed interval with respect to the third side face 8. Each of the second regions is a region which extends from either end of the first region in the opposing direction in which the third side face 8 and the fourth side face 10 oppose each other. The respective second electrode portions 28b extend from the first electrode portion 28a in such a manner that it is extracted respectively to the first and second side faces 4 and 6. The second electrode portions 28b are set so as to have a broader width in the direction perpendicular to the laminating direction and the opposing direction in which the first side face 4 and the second side face 6 oppose each other, (in other words, the opposing direction in which the third side face 8 and the fourth side face 10 oppose each other), in comparison with the first electrode portion 28a. One of the second electrode portions 28b is connected to the first terminal electrode 12 and the other to the second terminal electrode 14.

The fourth internal electrode 30 extends in such a manner that it is extracted to the fourth side face 10. The fourth internal electrode 30 comprises a first electrode potion 30a and a second electrode portion 30b. The first electrode portion 30a is disposed in a region surrounded by the third internal electrode 28, and it has a rectangular shape. The second electrode portion 30b extends from the first electrode portion 30a toward the central portion of the fourth side face 10 in the opposing direction in which the first side face 4 and the second side face 6 oppose each other, in such a manner that it borders the fourth side face 10. The second electrode portion 30b is connected to the fourth terminal electrode 18.

In the multilayer body 2, as described above, the first internal electrode layer 20 and the second internal electrode layer 26 are laminated alternately with a dielectric layer 32 interposed. In the multilayer body 2, the first to third capacitance components $C_1$, $C_2$, $C_3$ shown in FIG. 4 and FIG. 5 are formed by the laminating of the first internal electrode layer 20 and the second internal electrode layer 26.

By mutually superimposing the first internal electrode layer 20 and the second internal electrode layer 26, the second internal electrode 24 (first electrode portion 24a) and the fourth internal electrode 30 (first electrode portion 30a) form a region where they are mutually overlapping when viewed in the laminating direction, as shown in FIG. 3 and FIG. 4. The region where the second internal electrode 24 and the fourth internal electrode 30 are overlapping forms a first capacitance component $C_1$ of the multilayer capacitor 1. As shown in FIG. 5, the first capacitance component $C_1$ is connected in series between the third terminal electrode 16 and the fourth terminal electrode 18.

Due to the superimposition of the first internal electrode layer 20 and the second internal electrode layer 26, the first internal electrode 22 (first electrode portion 22a) and the fourth internal electrode 30 (second electrode portion 30b) form a region where they are mutually overlapping when viewed in the laminating direction as shown in FIG. 3 and FIG. 4. The region where the first internal electrode 22 and the fourth internal electrode 30 are overlapping forms a second capacitance component $C_2$ of the multilayer capacitor 1. As shown in FIG. 5, the second capacitance component $C_2$ is connected in series between the first terminal electrode 12 and the fourth terminal electrode 18.

Due to the superimposition of the first internal electrode layer 20 and the second internal electrode layer 26, the second internal electrode 24 (second electrode portion 24b) and the third internal electrode 28 (first electrode portion 28a) form a region where they are mutually overlapping when viewed in the laminating direction as shown in FIG. 3 and FIG. 4. The region where the second internal electrode 24 and the third internal electrode 28 are overlapping forms a third capacitance component $C_3$ of the multilayer capacitor 1. As shown in FIG. 5, the third capacitance component $C_3$ is connected in series between the second terminal electrode 14 and the third terminal electrode 16.

Next, a method of manufacturing the multilayer capacitor 1 having the aforementioned composition will be described.

Firstly, organic binder and organic solvent, and the like, are added to powdered dielectric ceramic material, thereby yielding slurry. This slurry is fabricated into a dielectric ceramic green sheet by means of a commonly known method, such as a ductor blade method.

Next, a plurality of conducting patterns (of a number corresponding to the number of divided chips described hereinafter) respectively making up the first internal electrode layer 20 (a first internal electrode 22 and a second internal electrode 24) are formed on an intended dielectric ceramic green sheet. Furthermore, a plurality of conducting patterns (of a number corresponding to the number of divided chips described hereinafter) respectively making up the second internal electrode layer 26 (a third internal electrode 28 and a fourth internal electrode 30) are formed on a different dielectric ceramic green sheet from the dielectric ceramic green sheet on which the conducting patterns making up the first internal electrode layer 20 are formed. The respective conducting patterns are formed, for example, by screen-printing conductive paste which includes Ni as a main component and then drying.

Next, the dielectric ceramic green sheet on which the conducting patterns making up the first internal electrode layer 20 are formed, the dielectric ceramic green sheet on which the conducting patterns making up the second internal electrode layer 26 are formed, and a dielectric ceramic green sheet formed with no conducting patterns, are laminated together in the laminating sequence shown in FIG. 2 and are pressure-bonded together. Thereby, an intermediate multilayer body including a plurality of dielectric ceramic green sheets is obtained. After cutting the intermediate multilayer body thus obtained into respective chips, the organic binder is removed, and the multilayer body is fired. Consequently, a multilayer body consisting internally of alternately laminated the first and second internal electrode layers 20 and 26 is obtained.

Thereupon, first to fourth terminal electrodes 12, 14, 16 and 18 are formed on the multilayer body 2 thus obtained. The respective terminal electrodes 12, 14, 16 and 18 are formed, for example, by coating respective opposing side faces with terminal electrode paste principally containing Cu, and then heating (baking) the paste. Thereupon, an Ni plating layer and an Sn plating layer are formed successively by electroplating, or the like, on the outer surfaces of the terminal electrodes 12, 14, 16 and 18. In this manner, a multilayer capacitor 1 is obtained.

As described above, according to the first embodiment, the first to third capacitance components $C_1$, $C_2$, $C_3$ are formed by laminating a first internal electrode layer 20 and a second internal electrode layer 26 with a dielectric layer 32 interposed. Consequently, in order to form the first to third capacitance components $C_1$, $C_2$, $C_3$, it is sufficient to form internal electrode layers of two types, namely, the first and second internal electrode layers 20 and 26. Therefore, it is possible to manufacture a multilayer capacitor 1 having three capacitance components $C_1$, $C_2$, $C_3$, readily, and hence reduction of manufacturing costs can be achieved.

Furthermore, in the first embodiment, the respective second electrode portions 22b and 28b of the first and third internal electrodes 22 and 28 are set to have a broader width in the direction perpendicular to the laminating direction and the opposing direction in which the first side face 4 and the second side face 6 oppose each other, in comparison with the respective first electrode portions 22a and 28a of the first and third internal electrodes 22 and 28. Consequently, the second electrode portions 22b and 28b have an increased length in the opposing direction in which the third side face 8 and the fourth side face 10 oppose each other. As a result, it is possible to achieve a reliable electrical connections between the first internal electrode 22 and the first and second terminal electrodes 12 and 14 and between the third internal electrode 28 and the first and second terminal electrodes 12 and 14.

Figure 6:
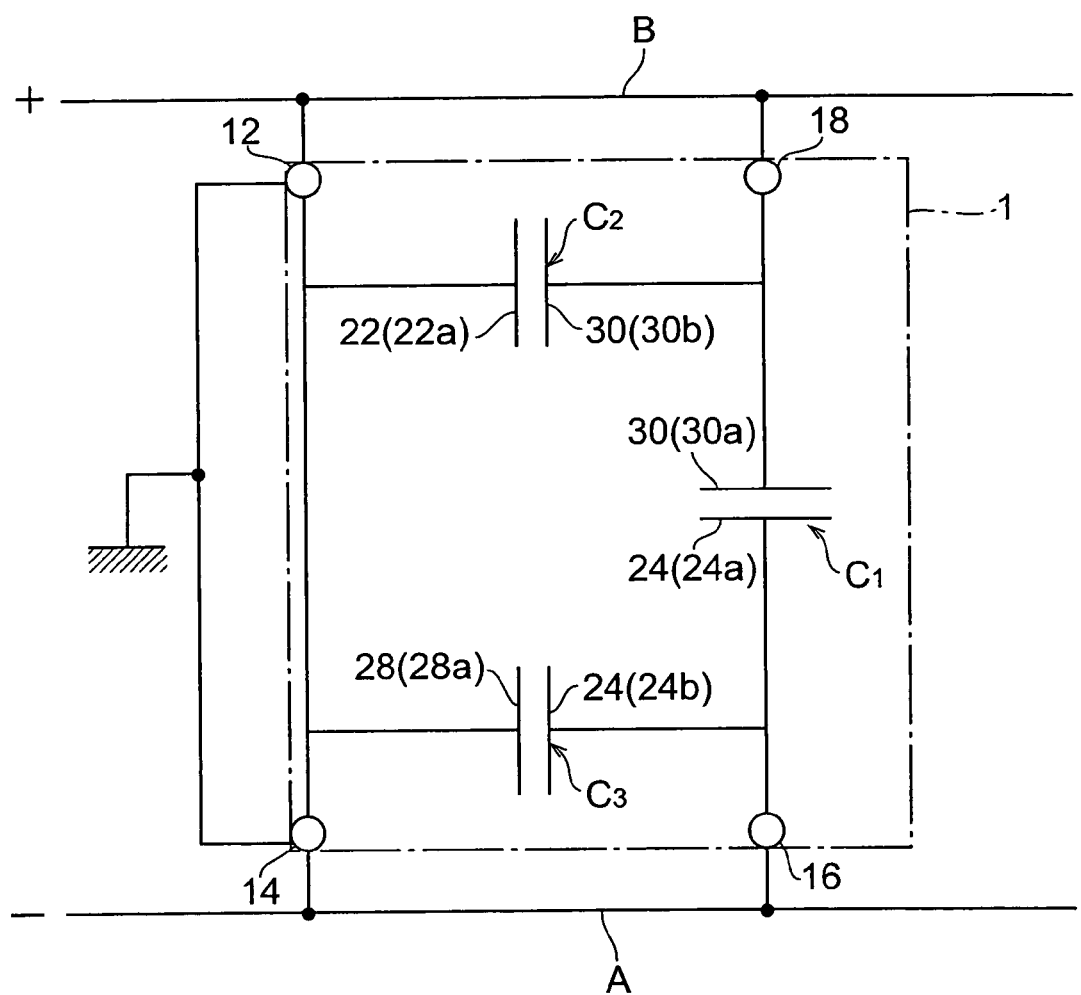
FIG. 6 is an equivalent circuit diagram of a case where the multilayer capacitor according to the first embodiment is used as a noise filter in a DC line.

Next, a circuit composition relating to a case where the multilayer capacitor 1 according to the first embodiment is used as a noise filter in a DC line, is described with reference to FIG. 6. FIG. 6 is an equivalent circuit diagram of a case where the multilayer capacitor according to the first embodiment is used as a noise filter in a DC line.

The multilayer capacitor 1 is provided between a negative power supply line A and a positive power supply line B. The first and second terminal electrodes 12 and 14 are connected to a ground potential. The third terminal electrode 16 is connected to the negative power line A and the fourth terminal electrode 18 is connected to the positive power supply line B.

In a DC line, the infiltration of common mode noise and differential mode noise is a problem. If the multilayer capacitor 1 is used as a noise filter, then the differential noise is absorbed by the first capacitance component $C_1$, and the common mode noise is absorbed by the second and third capacitance components $C_2$ and $C_3$. Therefore, if the multilayer capacitor 1 is installed in an electronic device as a noise filter, then it is possible to reduce the installation surface area of the noise filter in the electronic device significantly, compared to a prior art composition in which noise of these kinds is removed by installing three capacitors.

Figure 7:
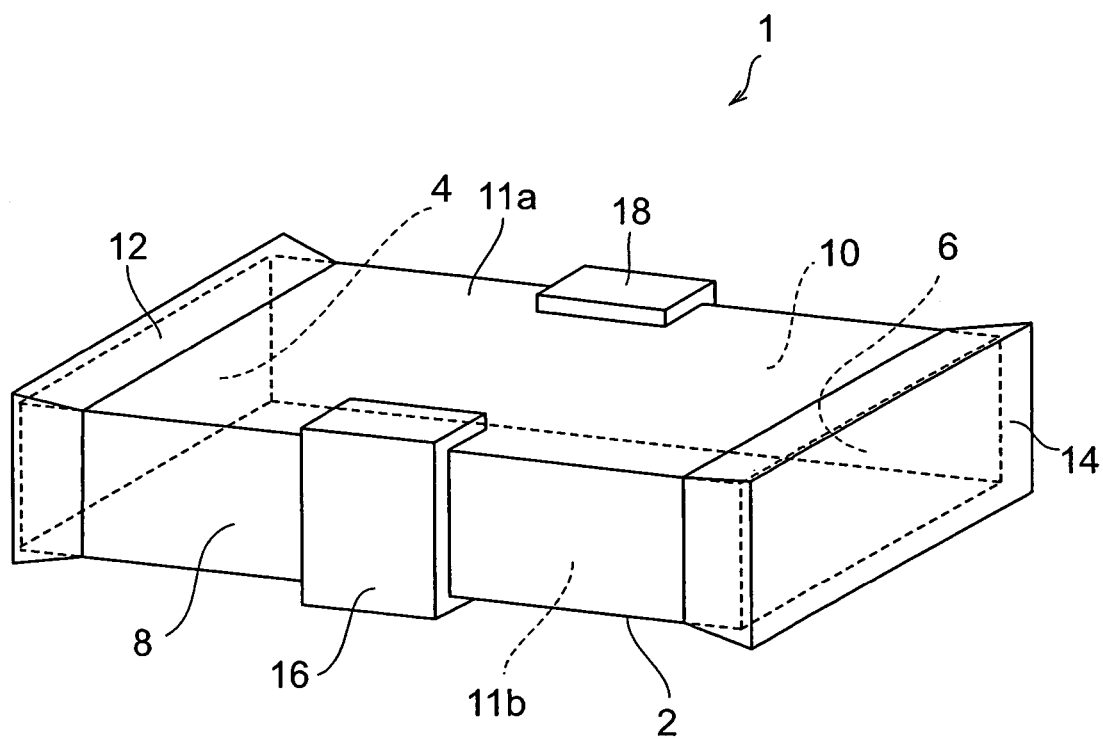
FIG. 7 is an oblique perspective diagram of a modification of the multilayer capacitor according to the first embodiment.
Figure 7:
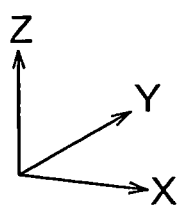
Figure 8:
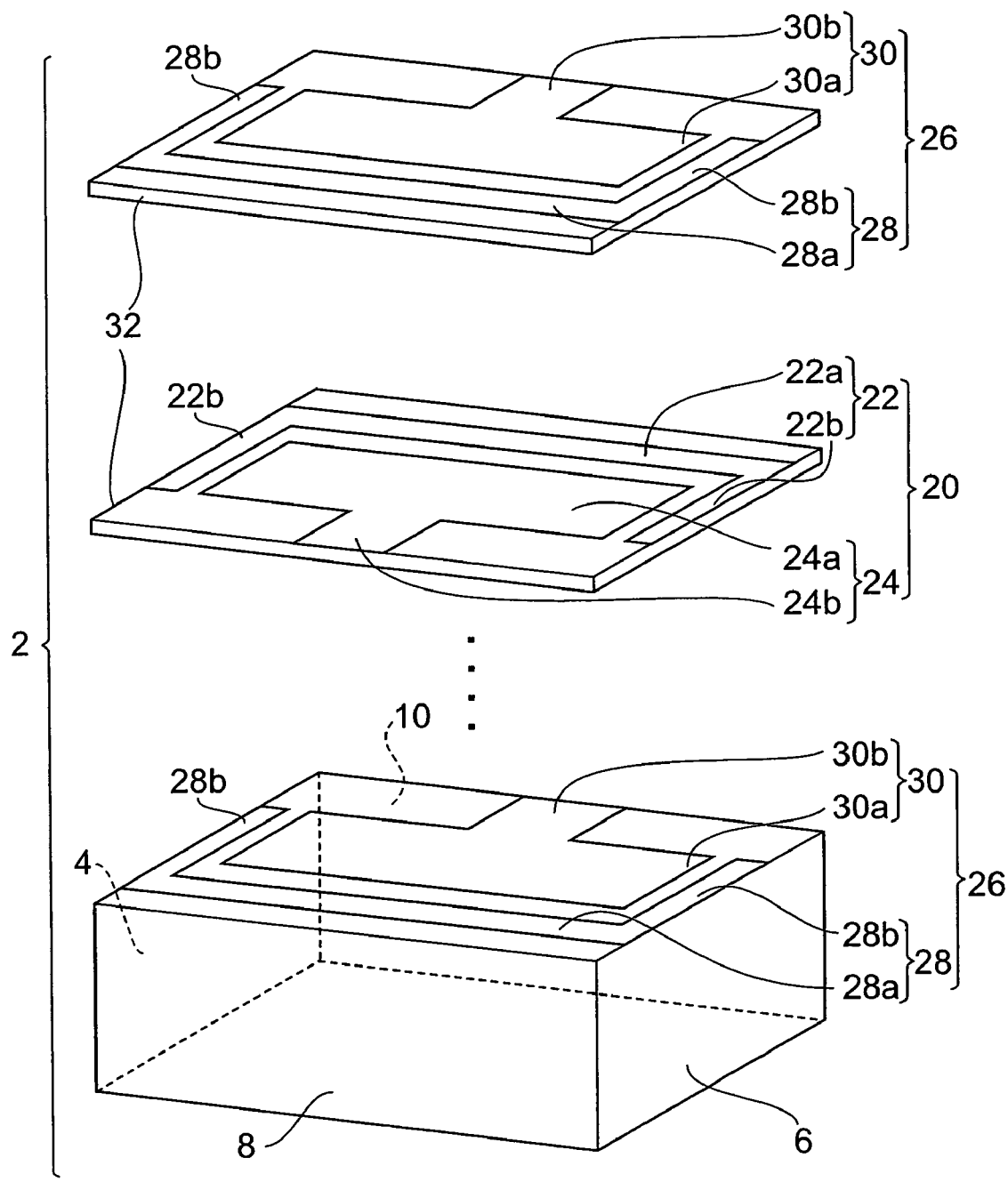
FIG. 8 is an exploded oblique perspective diagram showing a multilayer body included in the modification of the multilayer capacitor according to the first embodiment.
Figure 9:
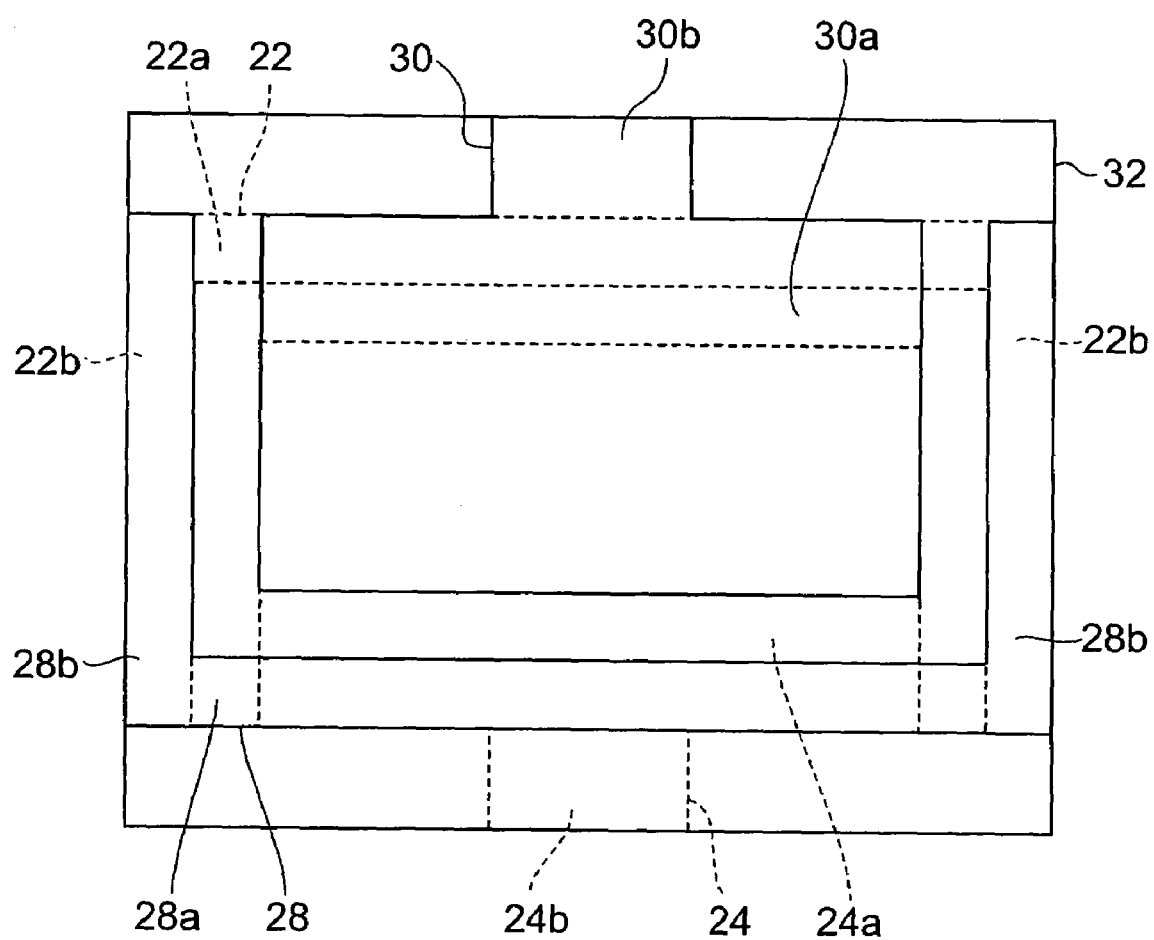
FIG. 9 is a plan diagram of a state where a first internal electrode layer and a second internal electrode layer included in the modification of a multilayer capacitor according to the first embodiment are mutually superimposed.
Figure 10:
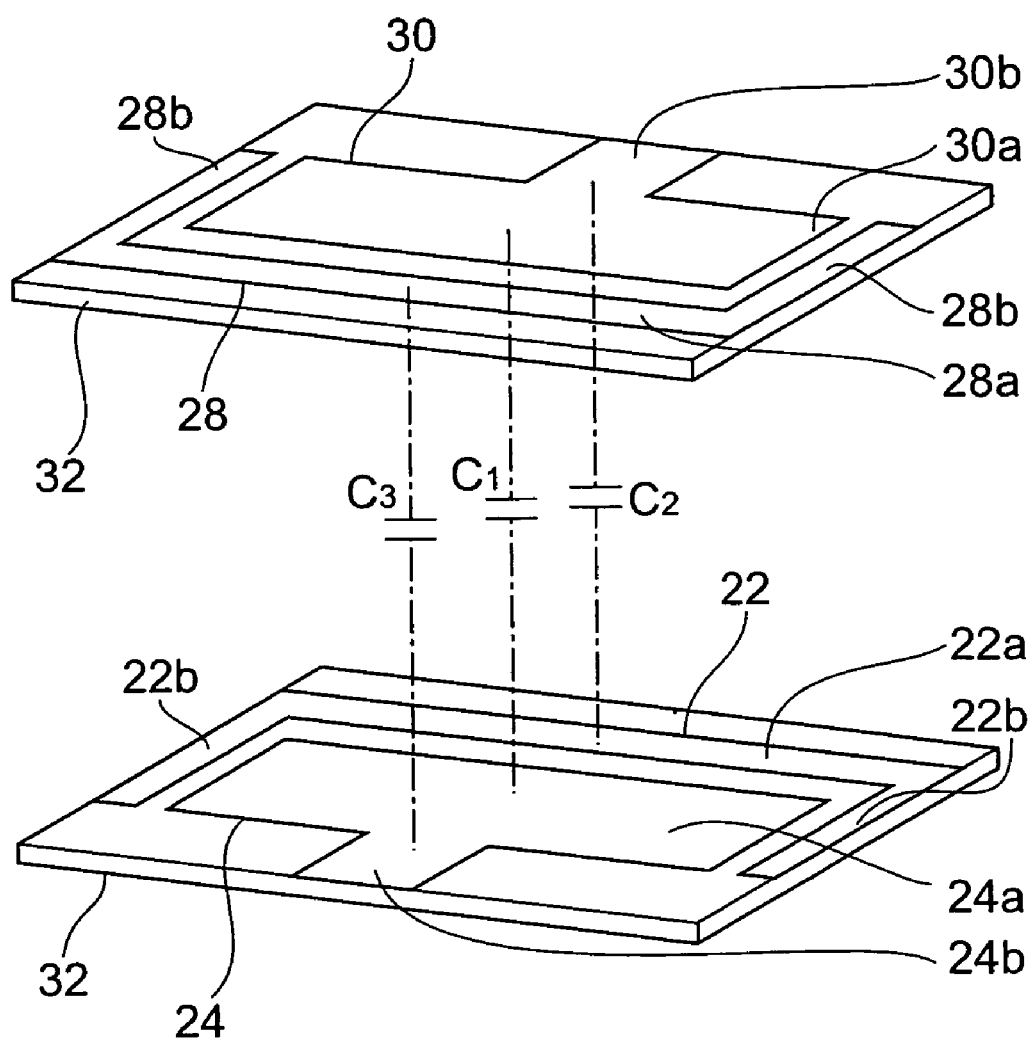
FIG. 10 is a diagram for describing the capacitance components formed by superimposing the first internal electrode layer and the second internal electrode layer included in the modification of the multilayer capacitor according to the first embodiment.

A modification of the multilayer capacitor 1 relating to the first embodiment is now described with reference to FIG. 7 to FIG. 10. FIG. 7 is an oblique perspective diagram of a modification of the multilayer capacitor according to the first embodiment. FIG. 8 is an exploded oblique perspective diagram showing a multilayer body included in the modification of the multilayer capacitor according to the first embodiment. A portion of the multilayer body is shown exploded in FIG. 8. FIG. 9 is a plan diagram of a state where a first internal electrode layer and a second internal electrode layer included in the modification of a multilayer capacitor according to the first embodiment are mutually superimposed. FIG. 10 is a diagram for describing the capacitance components formed by superimposing the first internal electrode layer and the second internal electrode layer included in the modification of the multilayer capacitor according to the first embodiment. In the first embodiment, the multilayer body 2 has a short dimension in the opposing direction in which the first side face 4 and the second side face 6 oppose each other, but in this modification, the multilayer body 2 has a short dimension in the opposing direction in which the third side face 8 and the fourth side face 10 oppose each other.

In the modification of the multilayer capacitor 1 according to the first embodiment, due to the superimposition of the first internal electrode layer 20 and the second internal electrode layer 26, the second internal electrode 24 (first electrode portion 24a) and the fourth internal electrode 30 (first electrode portion 30a) form a region where they are mutually overlapping when viewed in the laminating direction, as shown in FIG. 9 and FIG. 10. The region where the second internal electrode 24 and the fourth internal electrode 30 are overlapping forms a first capacitance component $C_1$ of the modification of the multilayer capacitor 1 according to the first embodiment.

In the modification of the multilayer capacitor 1 according to the first embodiment, due to the superimposition of the first internal electrode layer 20 and the second internal electrode layer 26, the first internal electrode 22 (first electrode portion 22a) and the fourth internal electrode 30 (first electrode portion 30a) form a region where they are mutually overlapping when viewed in the laminating direction, as shown in FIG. 9 and FIG. 10. The region where the first internal electrode 22 and the fourth internal electrode 30 are mutually overlapping forms a second capacitance component $C_2$ of the modification of the multilayer capacitor 1 according to first embodiment.

In the modification of the multilayer capacitor 1 according to the first embodiment, due to the superimposition of the first internal electrode layer 20 and the second internal electrode layer 26, the second internal electrode 24 (first electrode portion 24a) and the third internal electrode 28 (first electrode portion 28a) form a region where they are mutually overlapping when viewed in the laminating direction, as shown in FIG. 9 and FIG. 10. The region where the second internal electrode 24 and the third internal electrode 28 are mutually overlapping forms a third capacitance component $C_3$ of the modification of the multilayer capacitor 1 according to the first embodiment.

Figure 11:
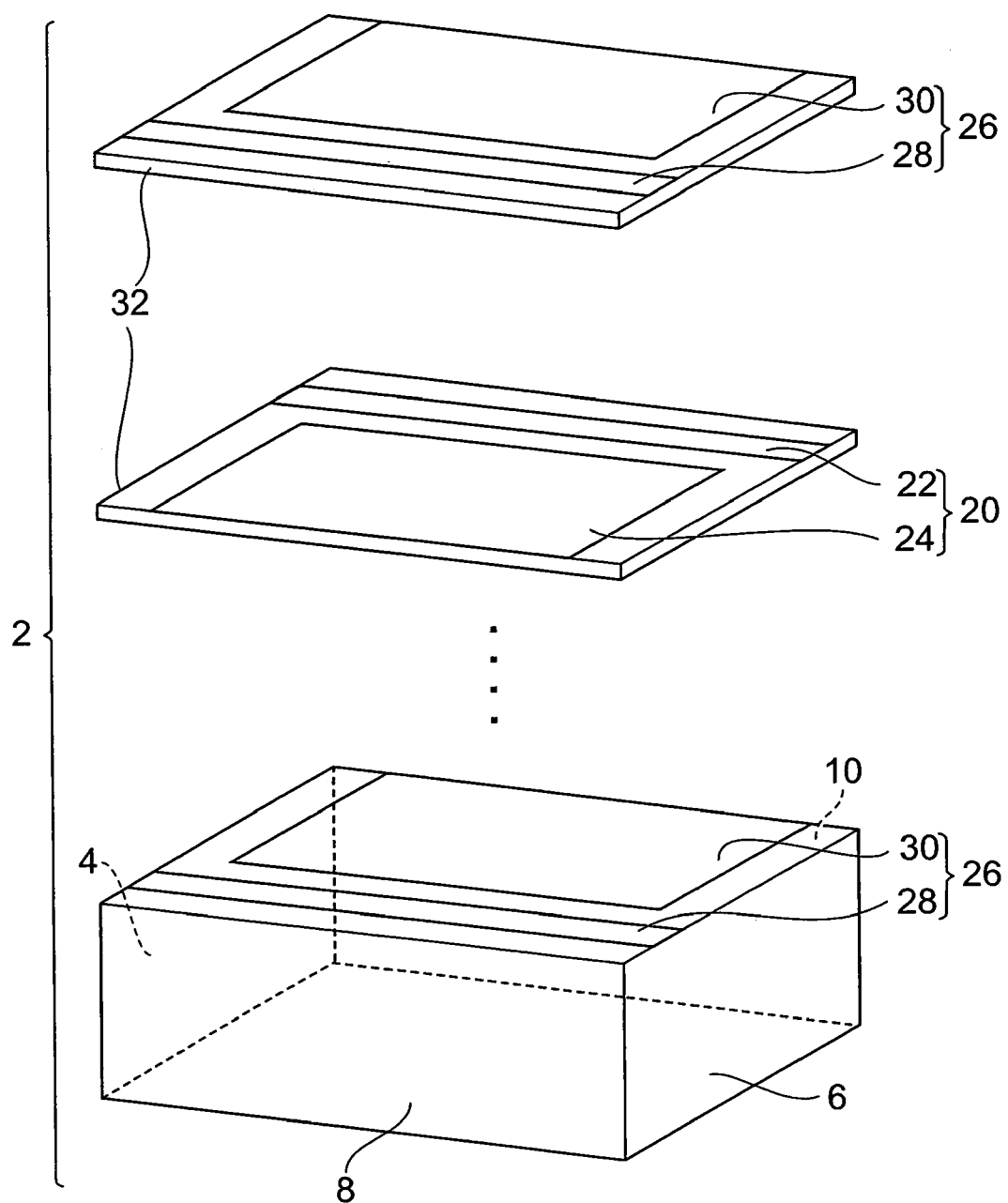
FIG. 11 is an exploded oblique perspective diagram showing a multilayer body included in a modification of the multilayer capacitor according to the first embodiment.
Figure 12:
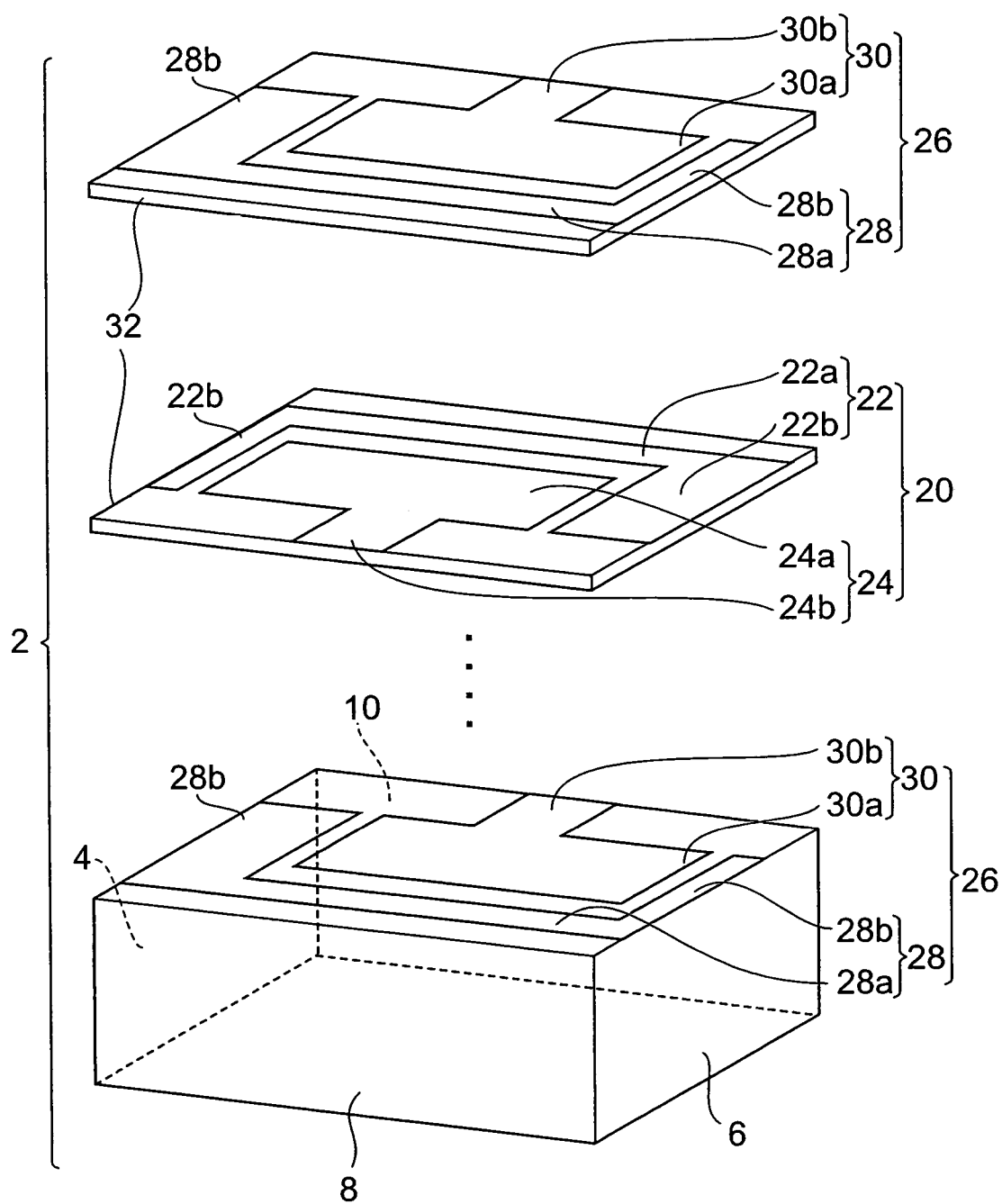
FIG. 12 is an exploded oblique perspective diagram showing a multilayer body included in a modification of the multilayer capacitor according to the first embodiment.

Furthermore, the respective shapes and surface areas of the first to fourth internal electrodes 22, 24, 28 and 30 can be set appropriately in accordance with the capacitance required in the first to third capacitance components $C_1$, $C_2$, and $C_3$. Consequently, the respective shapes of the first to fourth internal electrodes 22, 24 28 and 30 are not limited to the shapes given in the first embodiment or the modification. For example, with respect to the modification of the first embodiment, as shown in FIG. 11, the respective shapes of the first to fourth internal electrodes 22, 24, 28 and 30 may be a rectangular shape which extends in the opposing direction in which the first side face 4 and the second side face 6 oppose each other. Furthermore, with respect to the modification of the first embodiment, as shown in FIG. 12, the width of the respective second electrode portions 22b and 28b disposed on the first side face 4 in the opposing direction in which the first side face 4 and the second side face 6 oppose each other may be different from that of the second electrode portions 22b and 28b disposed on the second side face 6.

Figure 13:
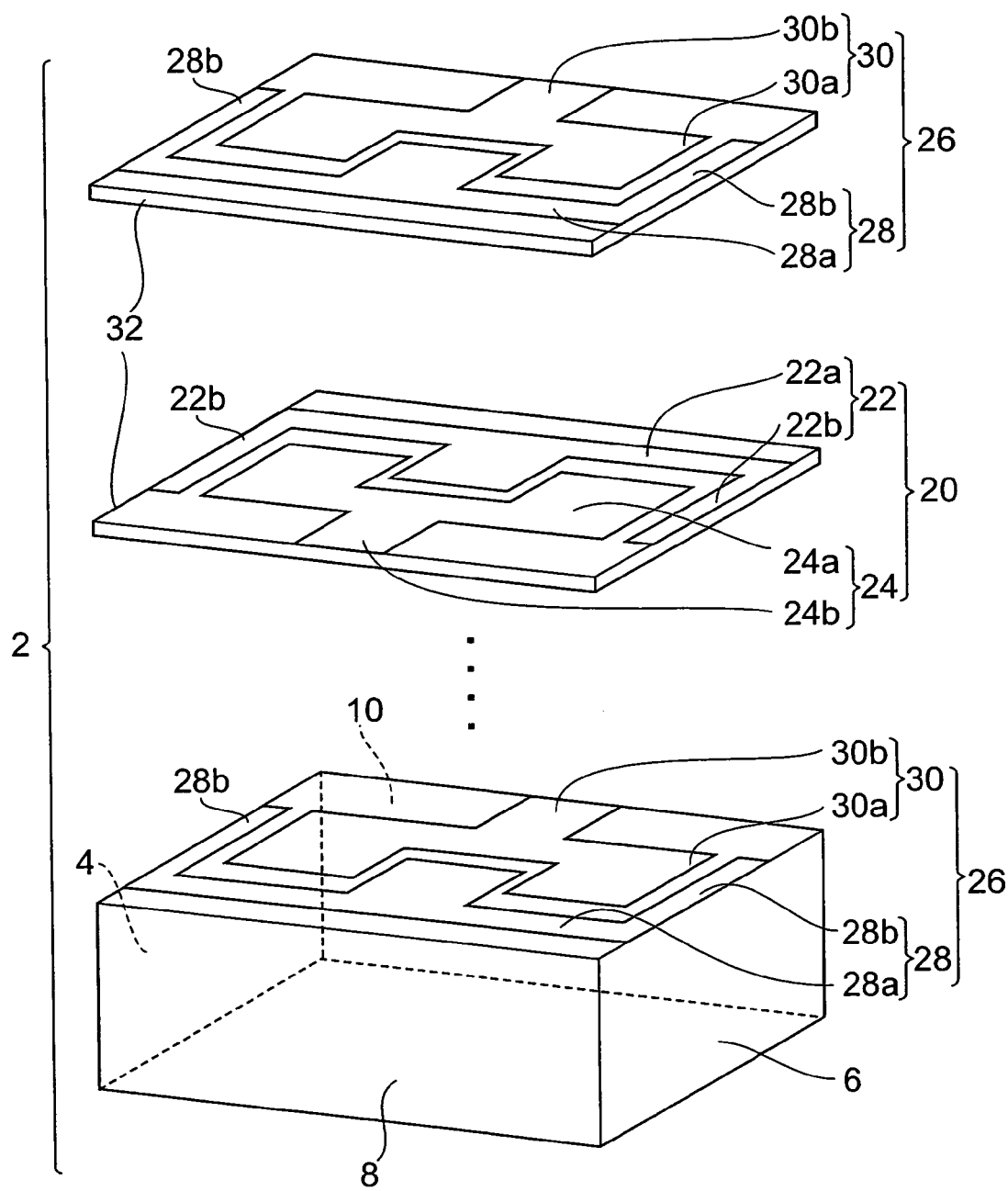
FIG. 13 is an exploded oblique perspective diagram showing a multilayer body included in a modification of the multilayer capacitor according to the first embodiment.

Furthermore, with respect to the modification of the first embodiment, as shown in FIG. 13, a region having a broad width in the opposing direction in which the third side face 8 and the fourth side face 10 oppose each other may be formed in a prescribed position of the respective first electrode portions 22a and 28a of the first and third internal electrodes 22 and 28 (namely, in a central position in the opposing direction in which the first side face 4 and the second side face 6 oppose each other, for example). A region having a narrow width in the opposing direction in which the third side face 8 and the fourth side face 10 oppose each other may also be formed respectively in the first electrode portions 24a and 30a of the second and fourth internal electrodes 24 and 30, so as to correspond with the broad regions of the first electrode portions 22a and 28a of the first and third internal electrodes 22 and 28.

Second Embodiment

Figure 14:
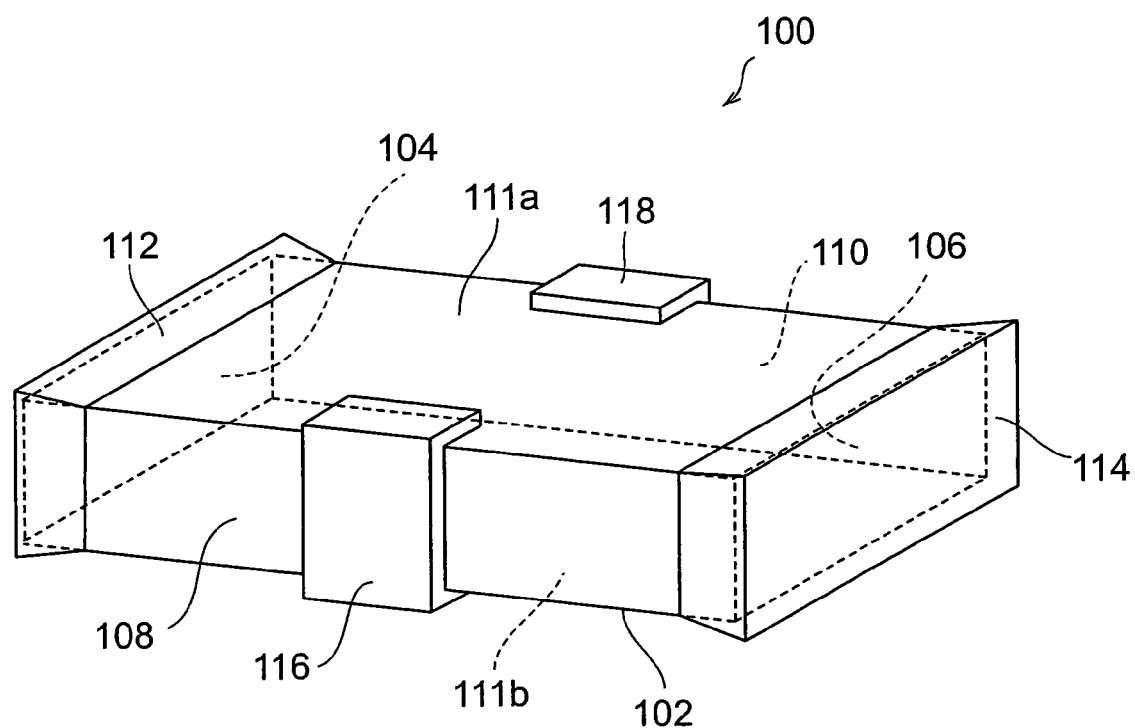
FIG. 14 is an oblique perspective diagram of a multilayer capacitor according to a second embodiment of the present invention.
Figure 14:
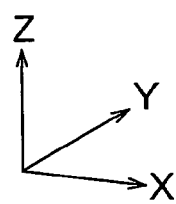
Figure 15:
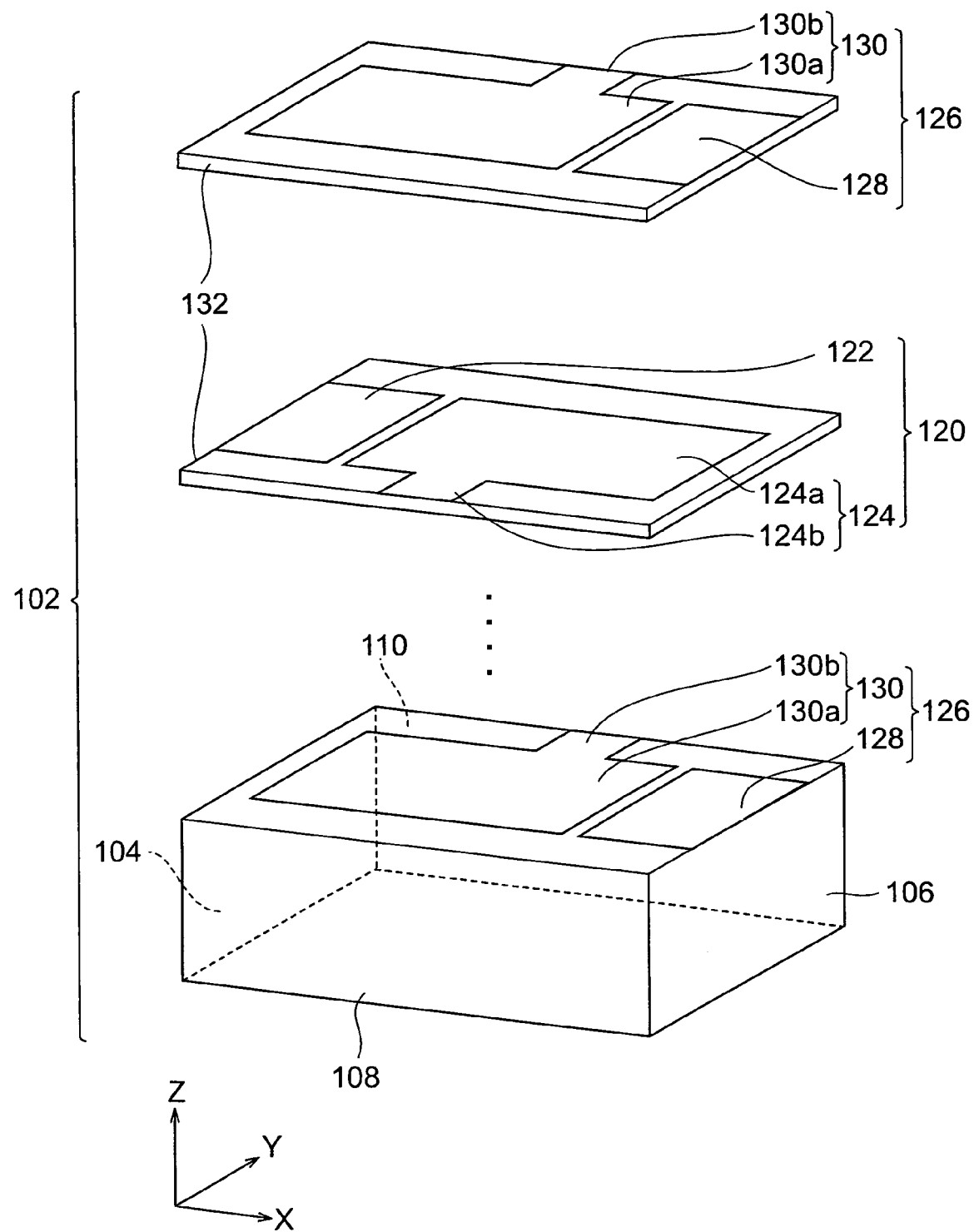
FIG. 15 is an exploded oblique perspective diagram showing a multilayer body included in the multilayer capacitor according to the second embodiment

The composition of a multilayer capacitor 100 according to a second embodiment is now described with reference to FIG. 14 to FIG. 18. FIG. 14 is an oblique perspective diagram of a multilayer capacitor according to the second embodiment. FIG. 15 is an exploded oblique perspective diagram showing a multilayer body included in the multilayer capacitor according to the second embodiment. A portion of the multilayer body is shown exploded in FIG. 15.

Figure 16:
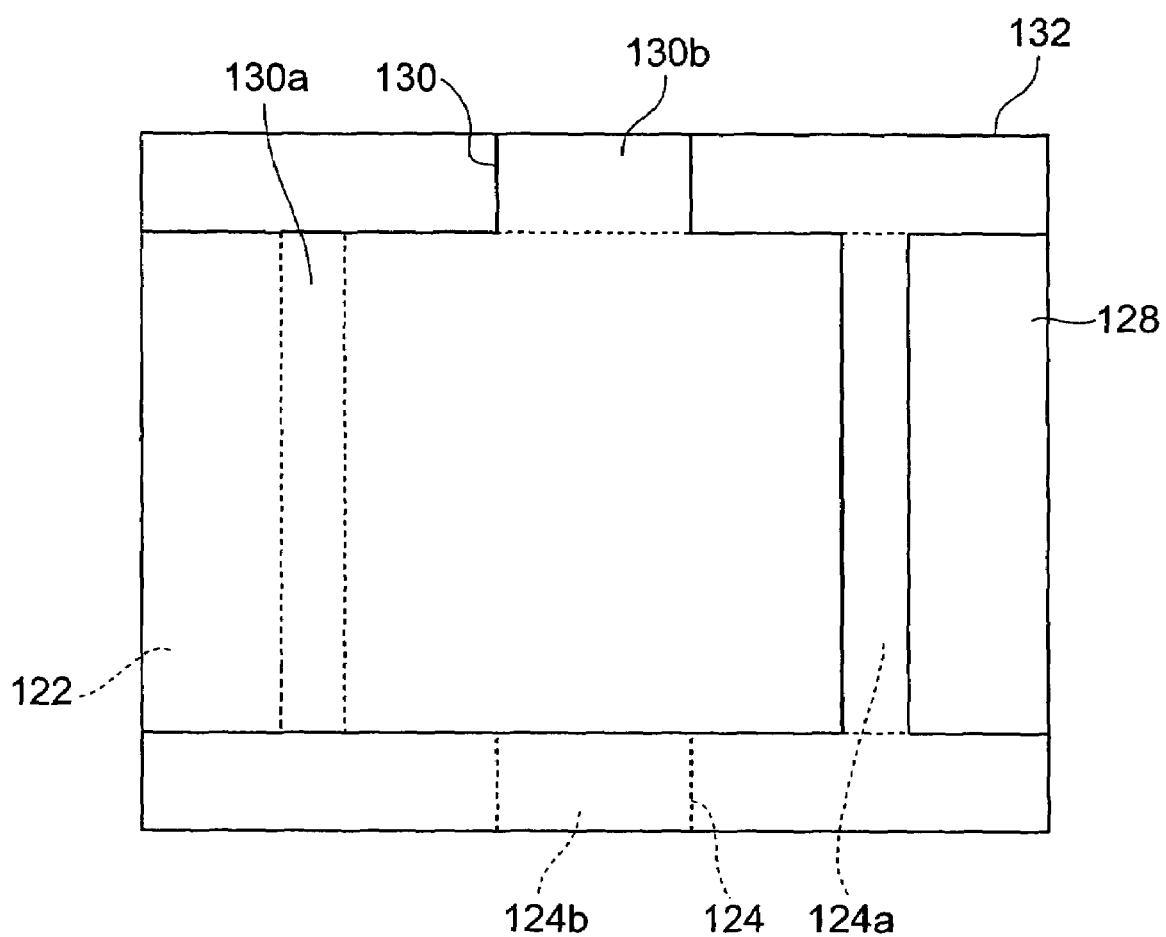
FIG. 16 is a plan diagram of a state where the first internal electrode layer and the second internal electrode layer included in the multilayer capacitor according to the second embodiment are mutually superimposed.
Figure 17:
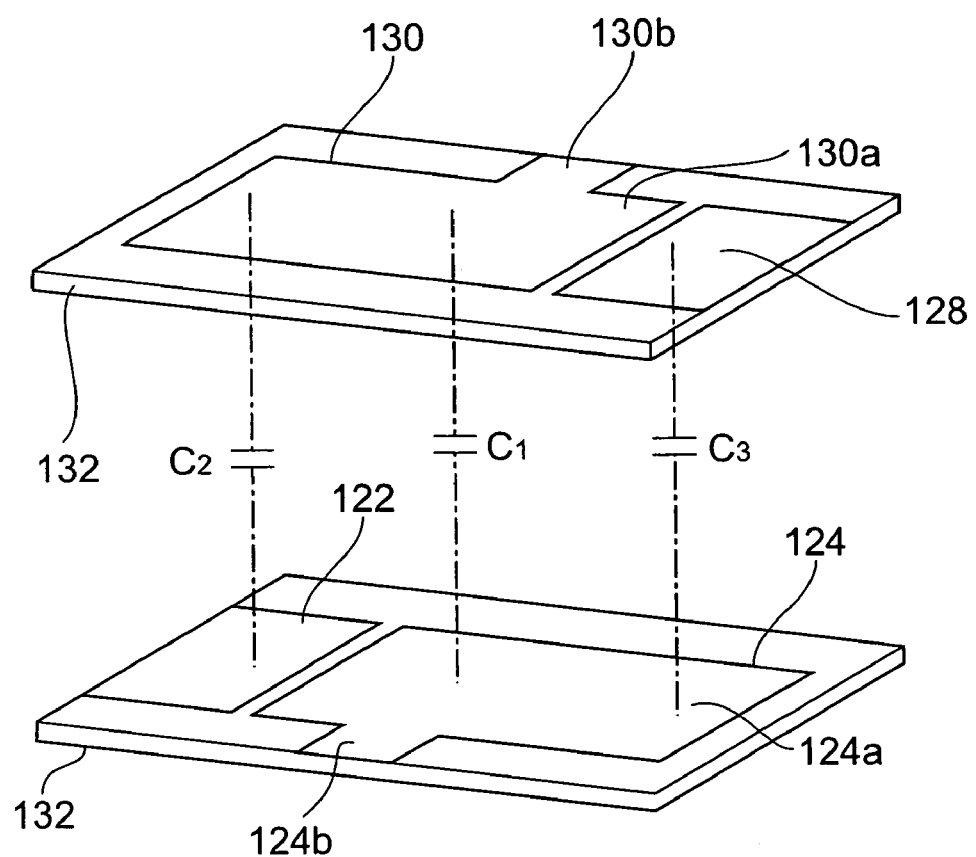
FIG. 17 is a diagram for describing the capacitance components formed by superimposition of the first internal electrode layer and the second internal electrode layer included in the multilayer capacitor according to the second embodiment.
Figure 18:
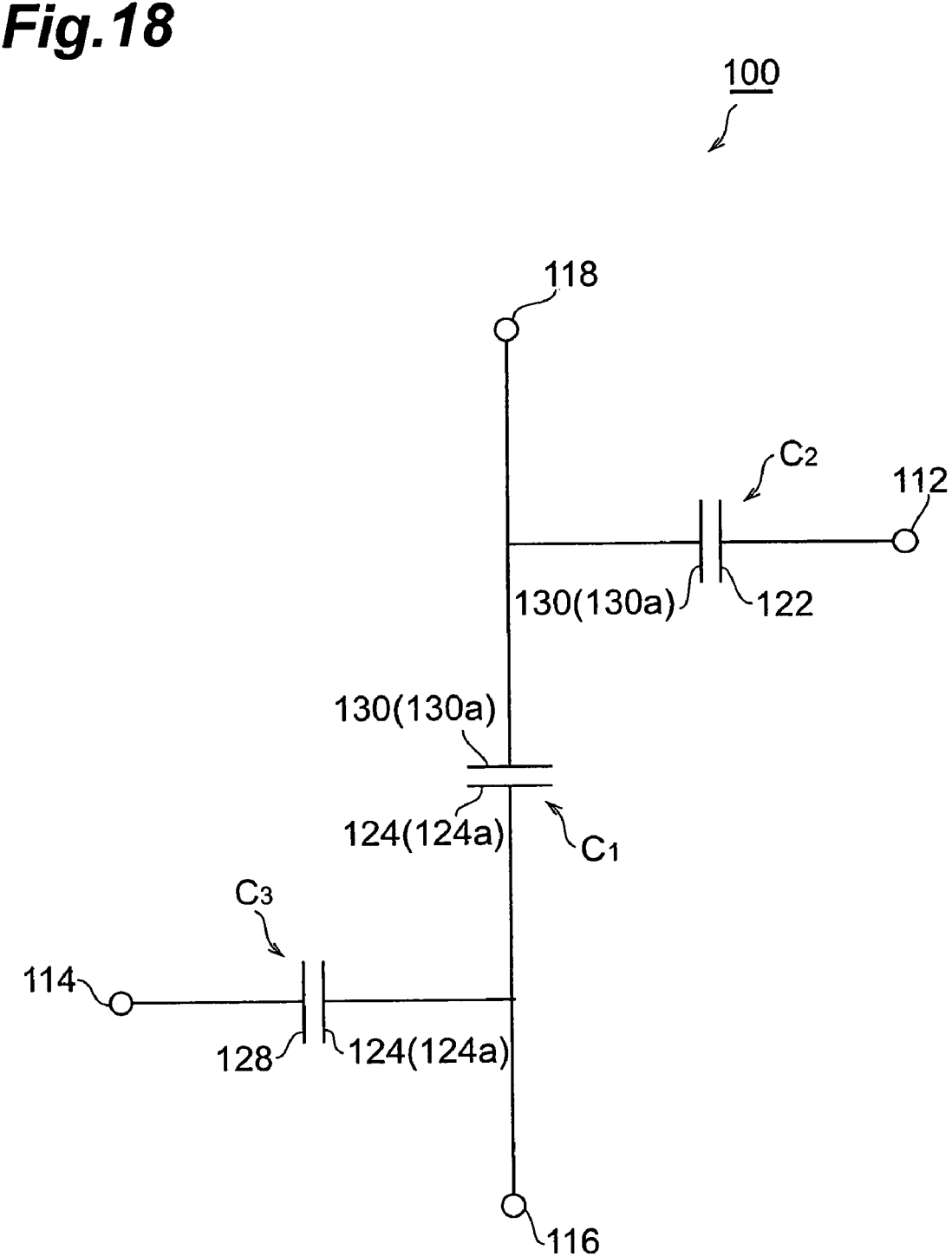
FIG. 18 is an equivalent circuit diagram of the multilayer capacitor according to the second embodiment.

FIG. 16 is a plan diagram of a state where the first internal electrode layer and the second internal electrode layer included in the multilayer capacitor according to the second embodiment are mutually superimposed. FIG. 17 is a diagram for describing the capacitance components formed by superimposition of the first internal electrode layer and the second internal electrode layer included in the multilayer capacitor according to the second embodiment. FIG. 18 is an equivalent circuit diagram of the multilayer capacitor according to the second embodiment.

As shown in FIG. 14, the multilayer capacitor 100 comprises a rectangular parallelepiped multilayer body 102, and first to fourth terminal electrodes 112, 114, 116 and 118. As shown in FIG. 15, the multilayer body 102 is constituted by alternately laminating a first internal electrode layer 120 and a second internal electrode layer 126, with a dielectric layer 132 interposed. The actual multilayer capacitor 100 is formed into an integrated body in such a manner that the boundaries between the dielectric layers 132 are not distinguishable.

As shown in FIG. 14, the multilayer body 102 has a first side face 104, a second side face 106, a third side face 108, a fourth side face 110, a fifth side face 111a, and a sixth side face 111b. The first side face 104 and the second side face 106 are disposed in such a manner that they oppose each other when viewed in the direction of the X axis. The third side face 108 and the fourth side face 110 are disposed in such a manner that they oppose each other when viewed in the direction of the Y axis. Consequently, the third side face 108 and the fourth side face 110 extend respectively in a direction that intersects with the first and second side faces 104, 106. The fifth side face 111a and the sixth side face 111b are disposed in such a manner that they oppose each other when viewed in the direction of the Z axis.

As shown in FIG. 15, each of the first to fourth side faces 104, 106, 108 and 110 lies in parallel with the Z axis direction, in other words, the laminating direction in which the first internal electrode layers 120 and the second internal electrode layers 126 are laminated (hereinafter, simply called the "laminating direction").

A first terminal electrode 112 is disposed on the first side face 104 of the multilayer body 102. The first terminal electrode 112 is formed in such a manner that it covers the first side face 104, while a portion thereof wraps over parts of the third to sixth side faces 108, 110, 111a and 111b. A second terminal electrode 114 is disposed on the second side face 106 of the multilayer body 102. The second terminal electrode 114 is formed in such a manner that it covers the second side face 106, while a portion thereof wraps over parts of the third to sixth side faces 108, 110, 111a, 111b.

A third terminal electrode 116 is disposed on the third side face 108 of the multilayer body 102. The third terminal electrode 116 is formed in such a manner that it covers the central portion of the third side face 108 in the X axis direction, in other words, the opposing direction in which the first side face 104 and the second side face 106 oppose each other, while a portion thereof wraps over parts of the fifth and sixth side faces 111a and 111b. A fourth terminal electrode 118 is disposed on the fourth side face 110 of the multilayer body 102. The fourth terminal electrode 118 is formed in such a manner that it covers the central portion of the fourth side face 110 in the X axis direction, in other words, the opposing direction in which the first side face 104 and the second side face 106 oppose each other, while a portion thereof wraps over parts of the fifth and sixth side faces 111a and 111b.

The first and second terminal electrodes 112 and 114, and the third and fourth terminal electrodes 116 and 118, have prescribed intervals therebetween respectively and are electrically insulated. The first terminal electrode 112 and the second terminal electrode 114 have a prescribed interval therebetween and are electrically insulated. The third terminal electrode 116 and the fourth terminal electrode 118 have a prescribed interval therebetween and are electrically insulated.

As shown in FIG. 15, each of the first internal electrode layers 120 includes a first internal electrode 122 and a second internal electrode 124. The first internal electrode 122 and the second internal electrode 124 are positioned in the same layer in a state of electrical insulation with respect to each other. The first internal electrode 122 is connected to the first terminal electrode 112. The second internal electrode 124 is connected to the third terminal electrode 116.

The first internal electrode 122 has a rectangular shape. The first internal electrode 122 is formed in a position having a prescribed interval from the second side face 106, and it extends toward the central portion of the first side face 104 in the Y axis direction, in other words, the opposing direction in which the third side face 108 and the fourth side face 110 oppose each other, in such a manner that it borders the first side face 104. Therefore, the first internal electrode 122 is extracted to the first side face 104.

The second internal electrode 124 extends in such a manner that it is extracted to the third side face 108. The second internal electrode 124 comprises a first electrode portion 124a and a second electrode portion 124b. The first electrode portion 124a has a rectangular shape. The first electrode portion 124a is disposed in line with the first internal electrode 122 in the opposing direction in which the first side face 104 and the second side face 106 oppose each other, in such a manner that it has a prescribed interval with respect to the first internal electrode 122. The second electrode portion 124b extends from the first electrode portion 124a toward the central portion of the third side face 108 in the opposing direction in which the first side face 104 and the second side face 106 oppose each other, in such a manner that it borders the third side face 108. The second electrode portion 124b is connected to the third terminal electrode 116.

As shown in FIG. 15, each of the second internal electrode layers 126 includes a third internal electrode 128 and a fourth internal electrode 130. The third internal electrode 128 and the fourth internal electrode 130 are disposed in the same layer in a state of electrical insulation with respect to each other. The third internal electrode 128 is connected to the second terminal electrode 114. the fourth internal electrode 130 is connected to the fourth terminal electrode 118.

The third internal electrode 128 has a rectangular shape. The third internal electrode 128 is formed in a position having a prescribed interval with respect to the first side face 104, and it extends toward the central portion of the second side face 106 in the Y axis direction, in other words, the opposing direction in which the third side face 108 and the fourth side face 110 oppose each other, in such a manner that it borders the second side face 106. Accordingly, the third internal electrode 128 is extracted to the second side face 106.

The fourth internal electrode 130 extends in such a manner that it is extracted to the fourth side face 110. The fourth internal electrode 130 comprises a first electrode portion 130a and a second electrode portion 130b. The first electrode portion 130a has a rectangular shape. The first electrode portion 130a is disposed in line with the third internal electrode 128 in the opposing direction in which the first side face 104 and the second side face 106 oppose each other, in such a manner that it has a prescribed interval with respect to the third internal electrode 128. The second electrode portion 130b extends from the first electrode portion 130a toward the central portion of the fourth side face 110 in the opposing direction in which the first side face 104 and the second side face 106 oppose each other, in such a manner that it borders the fourth side face 110. The second electrode portion 130b is connected to the fourth terminal electrode 118.

In the multilayer body 102, as described above, the first internal electrode layer 120 and the second internal electrode layer 126 are laminated alternately with a dielectric layer 132 interposed. In the multilayer body 102, the first to third capacitance components $C_1$, $C_2$ and $C_3$ shown in FIG. 17 and FIG. 18 are formed by laminating the first internal electrode layer 120 and the second internal electrode layer 126.

Due to the superimposition of the first internal electrode layer 120 and the second internal electrode layer 126, the second internal electrode 124 (first electrode portion 124a) and the fourth internal electrode 130 (first electrode portion 130a) form a region where they are mutually overlapping when viewed in the laminating direction, as shown in FIG. 16 and FIG. 17. The region where the second internal electrode 124 and the fourth internal electrode 130 are mutually overlapping in this way forms a first capacitance component $C_1$ of the multilayer capacitor 100. This first capacitance component $C_1$ is connected in series between the third terminal electrode 116 and the fourth terminal electrode 118, as shown in FIG. 18.

Due to the superimposition of the first internal electrode layer 120 and the second internal electrode layer 126, the first internal electrode 122 and the fourth internal electrode 130 (first electrode portion 130a) form a region where they are mutually overlapping when viewed in the laminating direction, as shown in FIG. 16 and FIG. 17. The region where the first internal electrode 122 and the fourth internal electrode 130 are mutually overlapping forms a second capacitance component $C_2$ of the multilayer capacitor 100. The second capacitance component $C_2$ is connected in series between the first terminal electrode 112 and the fourth terminal electrode 118, as shown in FIG. 18.

Due to the superimposition of the first internal electrode layer 120 and the second internal electrode layer 126, the second internal electrode 124 (first electrode portion 124a) and the third internal electrode 128 form a region in which they are mutually overlapping when viewed in the laminating direction, as shown in FIG. 16 and FIG. 17. The region where the second internal electrode 124 and the third internal electrode 128 are mutually overlapping forms a third capacitance component $C_3$ of the multilayer capacitor 100. The third capacitance component $C_3$ is connected in series between the second terminal electrode 114 and the third terminal electrode 116, as shown in FIG. 18.

Next, a method of manufacturing the multilayer capacitor 100 having the aforementioned composition will be described.

Firstly, organic binder and organic solvent, and the like, are added to powdered dielectric ceramic material, thereby yielding slurry. This slurry is fabricated into a dielectric ceramic green sheet by means of a commonly known method, such as a ductor blade method.

Next, a plurality of conducting patterns (of a number corresponding to the number of divided chips described hereinafter) respectively making up the first internal electrode layer 120 (the first internal electrode 122 and the second internal electrode 124) are formed on a prescribed dielectric ceramic green sheet. Furthermore, a plurality of conducting patterns (of a number corresponding to the number of divided chips described hereinafter) respectively making up the second internal electrode layer 126 (the third internal electrode 128 and the forth internal electrode 130) are formed on a different dielectric ceramic green sheet from the dielectric ceramic green sheet on which the conducting patterns making up the first internal electrode layer 120 are formed. The respective conducting patterns are formed, for example, by screen-printing conductive paste which includes Ni as a main component and then drying.

Next, the dielectric ceramic green sheet on which the conducting patterns making up the first internal electrode layer 120 are formed, the dielectric ceramic green sheet on which the conducting patterns making up the second internal electrode layer 126 are formed, and a dielectric ceramic green sheet formed with no conducting patterns, are laminated together in the laminating sequence shown in FIG. 15 and are pressure-bonded together. Thereby, an intermediate multilayer body including a plurality of dielectric ceramic green sheets is obtained. After cutting the intermediate multilayer body thus obtained into respective chips, the organic binder is removed, and the multilayer body is fired. Consequently, a multilayer body 2 consisting internally of alternately laminated the first and second internal electrode layers 120 and 126 is obtained.

Thereupon, first to fourth terminal electrodes 112, 114, 116 and 118 are formed on the multilayer body 2 thus obtained. The respective terminal electrodes 112, 114, 116 and 118 are formed, for example, by coating respective opposing side faces with terminal electrode paste principally containing Cu and then heating (baking) the paste. Thereupon, an Ni plating layer and an Sn plating layer are formed successively by electroplating, or the like, on the outer surfaces of the terminal electrodes 112, 114, 116 and 118. In this manner, a multilayer capacitor 100 is obtained.

As described above, according to the present embodiment the first to third capacitance components $C_1$, $C_2$, $C_3$ are formed by laminating a first internal electrode layer 120 and a second internal electrode layer 126 with a dielectric layer 132 interposed. Consequently, in order to form the first to third capacitance components $C_1$, $C_2$, $C_3$, it is sufficient to form internal electrode layers of two types, namely, the first and second internal electrode layers 120 and 126. Therefore, it is possible to manufacture a multilayer capacitor 100 having three capacitance components $C_1$, $C_2$, $C_3$, readily, and hence reduction of manufacturing costs can be achieved.

Figure 19:
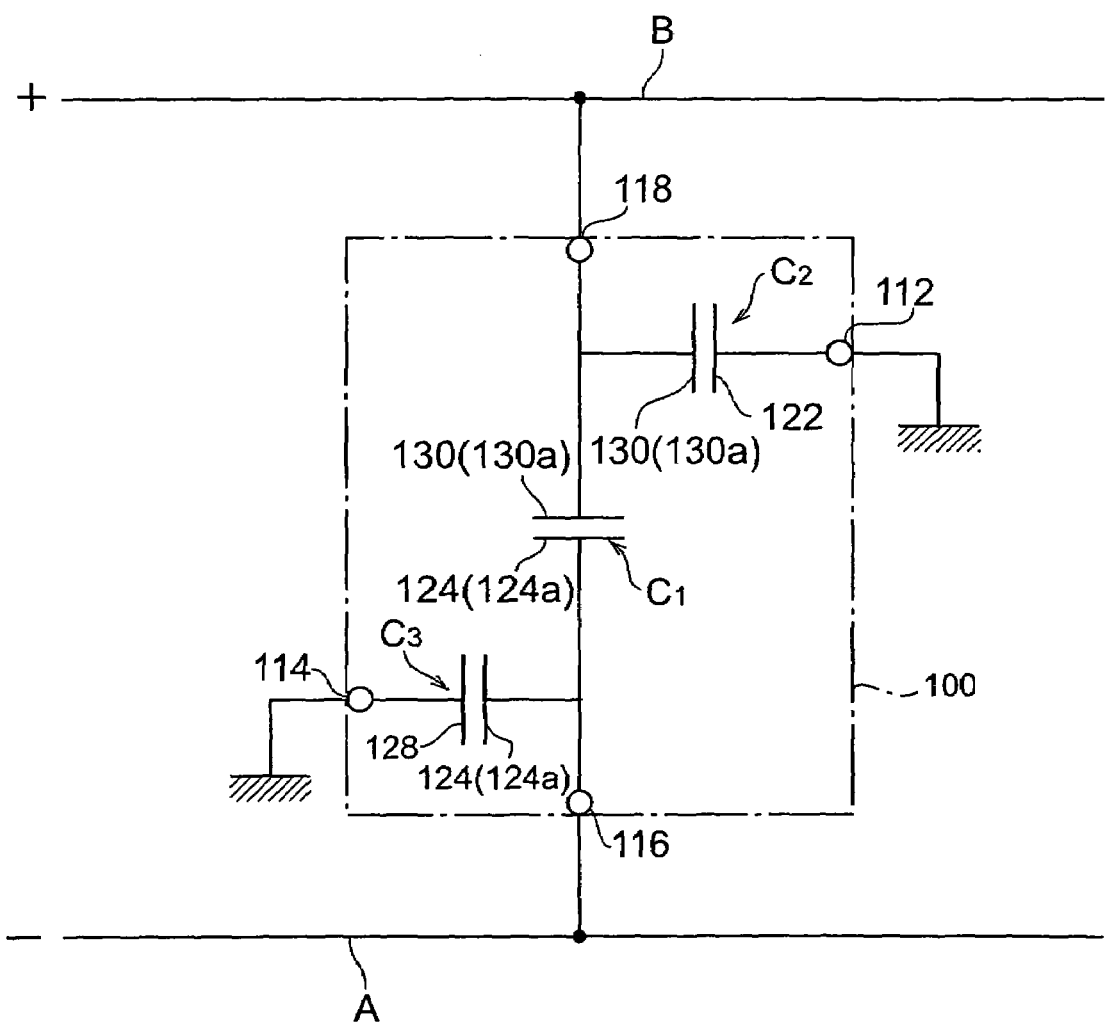
FIG. 19 is an equivalent circuit diagram of a case where the multilayer capacitor according to the second embodiment is used as a noise filter in a DC line.

Next, a circuit composition relating to a case where the multilayer capacitor 100 according to the present embodiment is used as a noise filter in a DC line, is described with reference to FIG. 19. FIG. 19 is an equivalent circuit diagram of a case where the multilayer capacitor according to the present embodiment is used as a noise filter in a DC line.

The multilayer capacitor 100 is provided between a negative power supply line A and a positive power supply line B. The first and second terminal electrodes 112 and 114 are connected to a ground potential. The third terminal electrode 116 is connected to the negative power supply line A and the fourth terminal electrode 118 is connected to the positive power supply line B.

In a DC line, the infiltration of common mode noise and differential mode noise is a problem. If the multilayer capacitor 100 is used as a noise filter, then the differential noise is absorbed by the first capacitance component $C_1$, and the common mode noise is absorbed by the second and third capacitance components $C_2$ and $C_3$. Therefore, if the multilayer capacitor 100 is installed in an electronic device as a noise filter, then it is possible to reduce the installation surface area of the noise filter in the electronic device significantly, compared to a prior art composition in which noise of these kinds is removed by installing three capacitors.

Next, a modification of the multilayer capacitor according to the second embodiment will be described with reference to FIG. 20 to FIG. 24.

Figure 20:
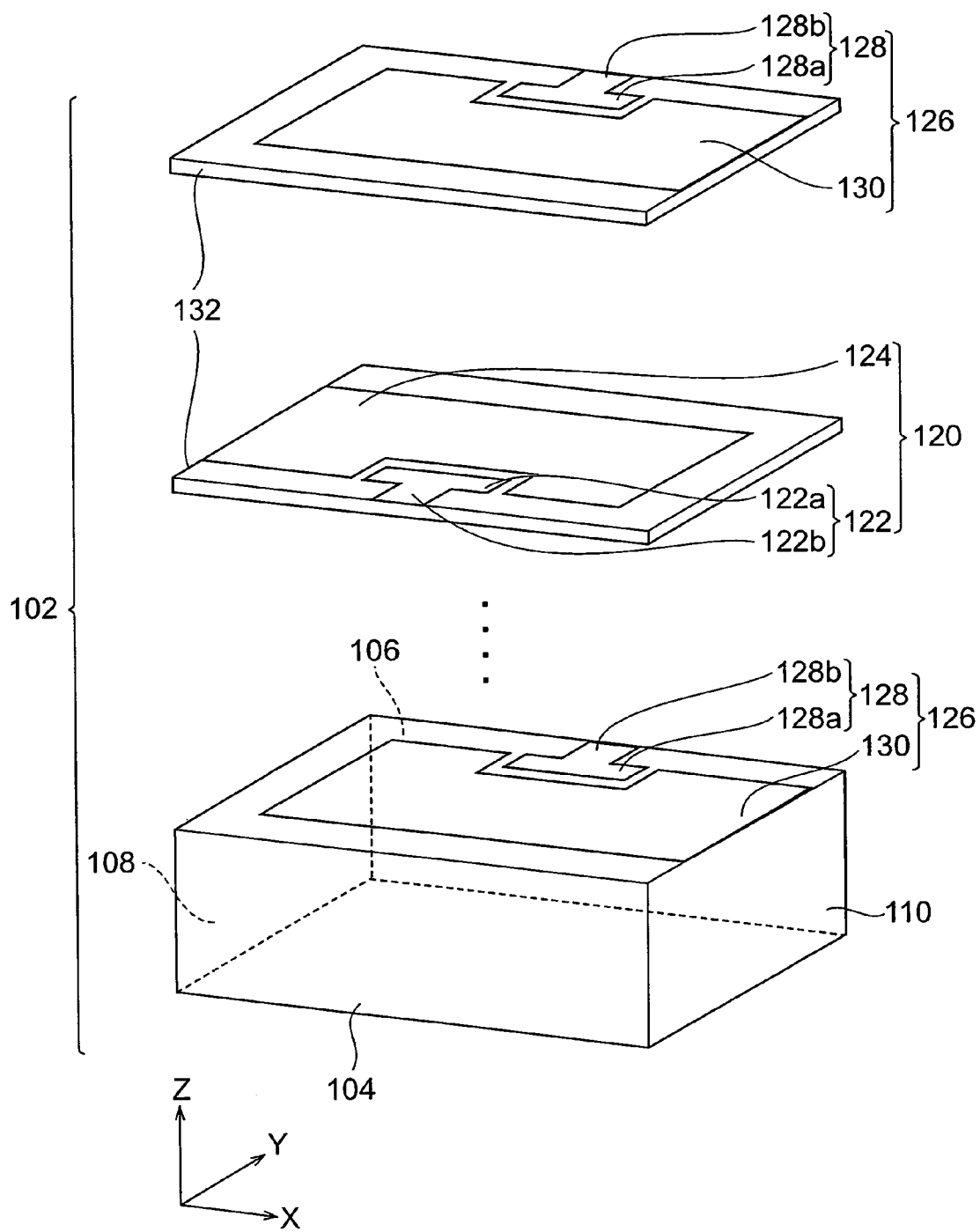
FIG. 20 is an exploded oblique perspective diagram showing a multilayer body included in a multilayer capacitor according to a first modification of the second embodiment.
Figure 21:
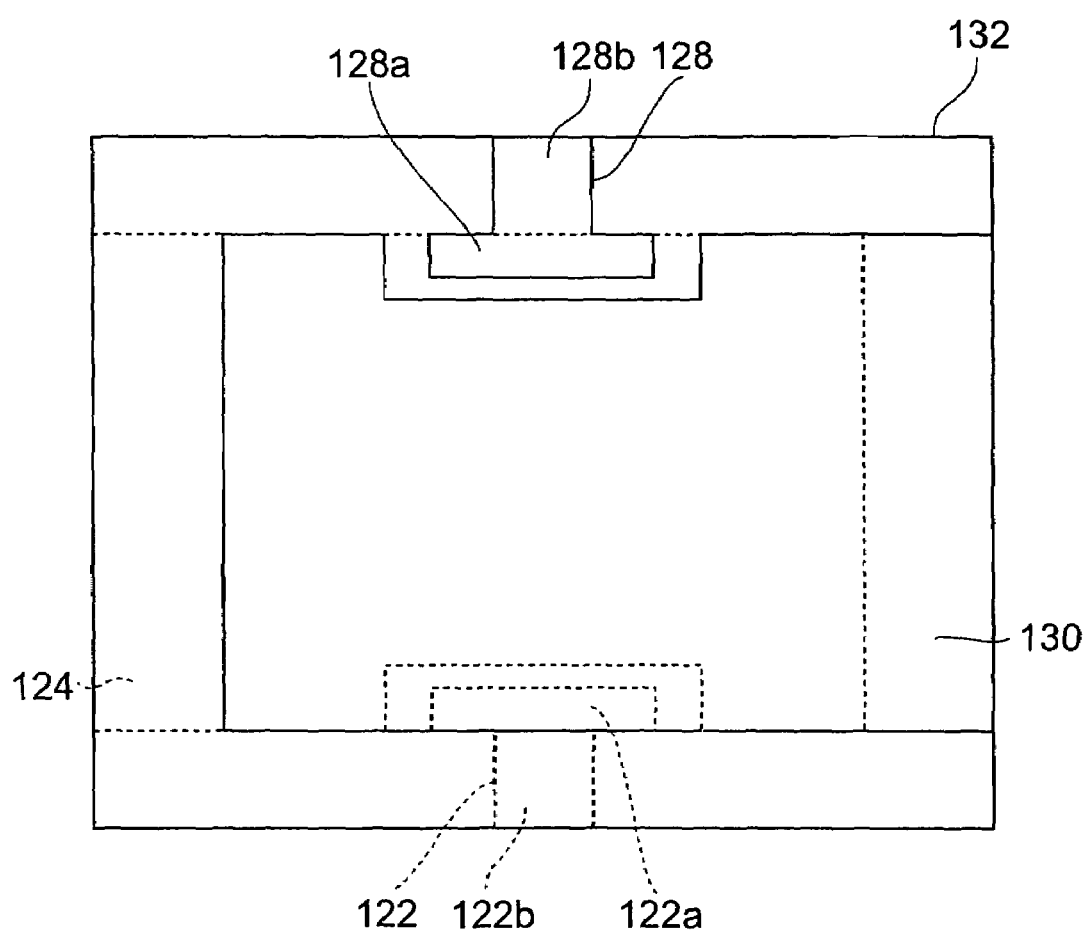
FIG. 21 is a plan diagram showing a state where the first internal electrode layer and the second internal electrode layer included in the multilayer capacitor according to the first modification of the second embodiment are mutually superimposed.
Figure 22:
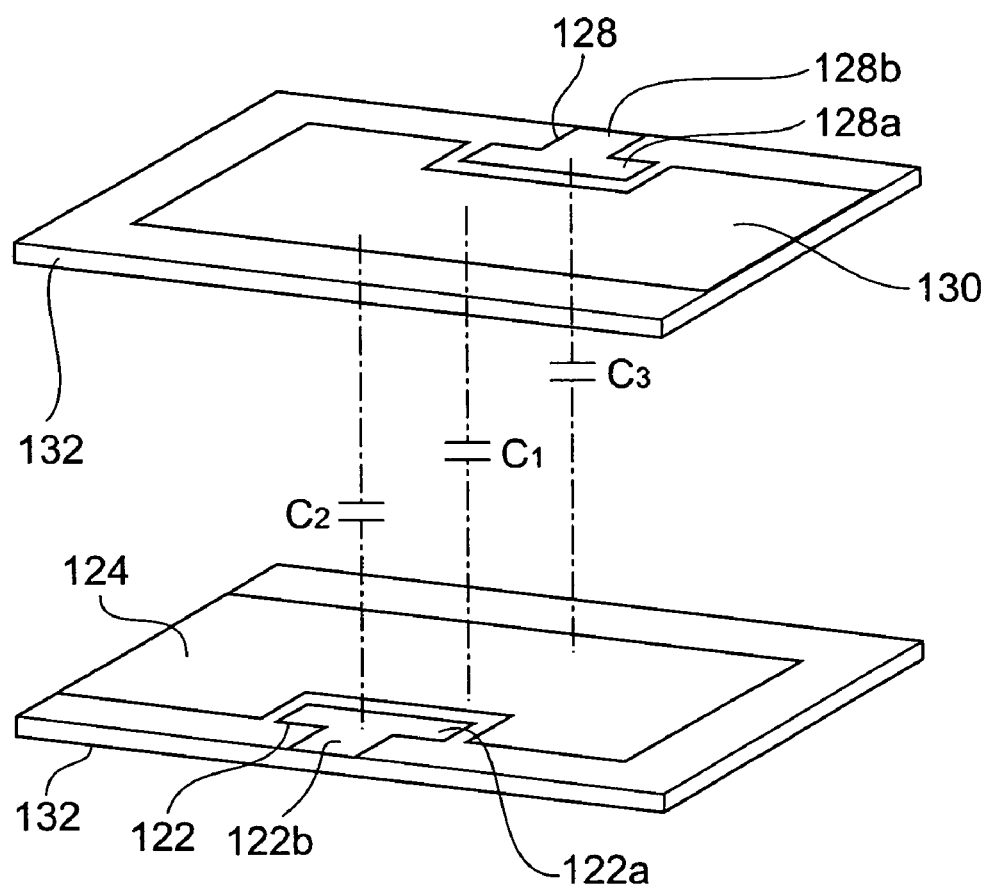
FIG. 22 is a diagram for describing the capacitance components formed by superimposition of the first internal electrode layer and the second internal electrode layer included in the multilayer capacitor according to the first modification of the second embodiment.

FIG. 20 is an exploded oblique perspective diagram showing a multilayer body included in a multilayer capacitor according to a first modification of the second embodiment. A portion of the multilayer body is shown exploded in FIG. 20. FIG. 21 is a plan diagram showing a state where the first internal electrode layer and the second internal electrode layer included in the multilayer capacitor according to the first modification of the second embodiment are mutually superimposed. FIG. 22 is a diagram for describing the capacitance components formed by superimposition of the first internal electrode layer and the second internal electrode layer included in the multilayer capacitor according to the first modification of the second embodiment.

In the multilayer body of the multilayer capacitor 100 according to the second embodiment, the opposing direction in which the first side face and the second side face oppose each other is taken to be the lengthwise direction, whereas in the multilayer body of the multilayer capacitor according to the first modification, the opposing direction in which the third side face and the fourth side face oppose each other is taken to be the lengthwise direction.

The first side face 104 and the second side face 106 are disposed in such a manner that they oppose each other when viewed in the Y axis direction, as shown in FIG. 20. The third side face 108 and the fourth side face 110 are disposed in such a manner that oppose each other when viewed in the X axis direction, as shown in FIG. 20.

Each of the first internal electrode layers 120 comprises a first internal electrode 122 and a second internal electrode 124, as shown in FIG. 20. The first internal electrode 122 comprises a first electrode portion 122a and a second electrode portion 122b. The first electrode portion 122a has a rectangular shape. The first electrode portion 122a has a prescribed interval with respect to the first side face 104 and is disposed in the vicinity of the central region in the opposing direction in which the third side face 108 and the fourth side face 110 oppose each other. The second electrode portion 122b extends from the first electrode portion 122a toward the central portion of the first side face 104 in the opposing direction in which the third side face 108 and the fourth side face 110 oppose each other, in such a manner that it borders the first side face 104. Consequently, the first internal electrode 122 is extracted to the first side face 104.

The second internal electrode 124 has an approximate rectangular shape extending in such a manner that it is extracted to the third side face 108. The second internal electrode 124 is set so as to have a region whose width is narrow in the opposing direction in which the first side face 104 and the second side face 106 oppose each other, in the vicinity of the central region in the opposing direction in which the third side face 108 and the fourth side face 110 oppose each other, so as to correspond to the first electrode portion 122a. Consequently, the second internal electrode 124 surrounds the first electrode portion 122a of the first internal electrode 122.

The third internal electrode 128 comprises a first electrode portion 128a and a second electrode portion 128b. The first electrode portion 128a has a rectangular shape. The first electrode portion 128a has a prescribed interval with respect to the second side face 106 and is disposed in the vicinity of the central region in the opposing direction in which the third side face 108 and the fourth side face 110 oppose each other. The second electrode portion 128b extends from the first electrode portion 128a toward the central portion of the second side face 106 in the opposing direction in which the third side face 108 and the fourth side face 110 oppose each other, in such a manner that it borders the second side face 106. Consequently, the third internal electrode 128 is extracted to the second side face 106.

The fourth internal electrode 130 has an approximate rectangular shape extending in such a manner that it is extracted to the fourth side face 110. The fourth internal electrode 130 is set so as to have a region whose width is narrow in the opposing direction in which the first side face 104 and the second side face 106 oppose each other, in the vicinity of the central region in the opposing direction in which the third side face 108 and the fourth side face 110 oppose each other, so as to correspond to the first electrode portion 128a Consequently, the fourth internal electrode 130 surrounds the first electrode portion 128a of the third internal electrode 128.

As shown in FIG. 21 and FIG. 22, due to the superimposition of the first internal electrode layer 120 and the second internal electrode layer 126, the second internal electrode 124 and the fourth internal electrode 130 form a region in which they are mutually overlapping when viewed in the laminating direction. Due to the superimposition of the first internal electrode layer 120 and the second internal electrode layer 126, the first internal electrode 122 (first electrode portion 122a) and the fourth internal electrode 130 form a region in which they are mutually overlapping when viewed in the laminating direction. Due to the superimposition of the first internal electrode layer 120 and the second internal electrode layer 126, the second internal electrode 124 and the third internal electrode 128 (first electrode portion 128a) form a region in which they are mutually overlapping when viewed in the laminating direction. These overlapping regions respectively form first to third capacitance components, and create a circuit equivalent to the circuit shown in FIG. 18.

Figure 23:
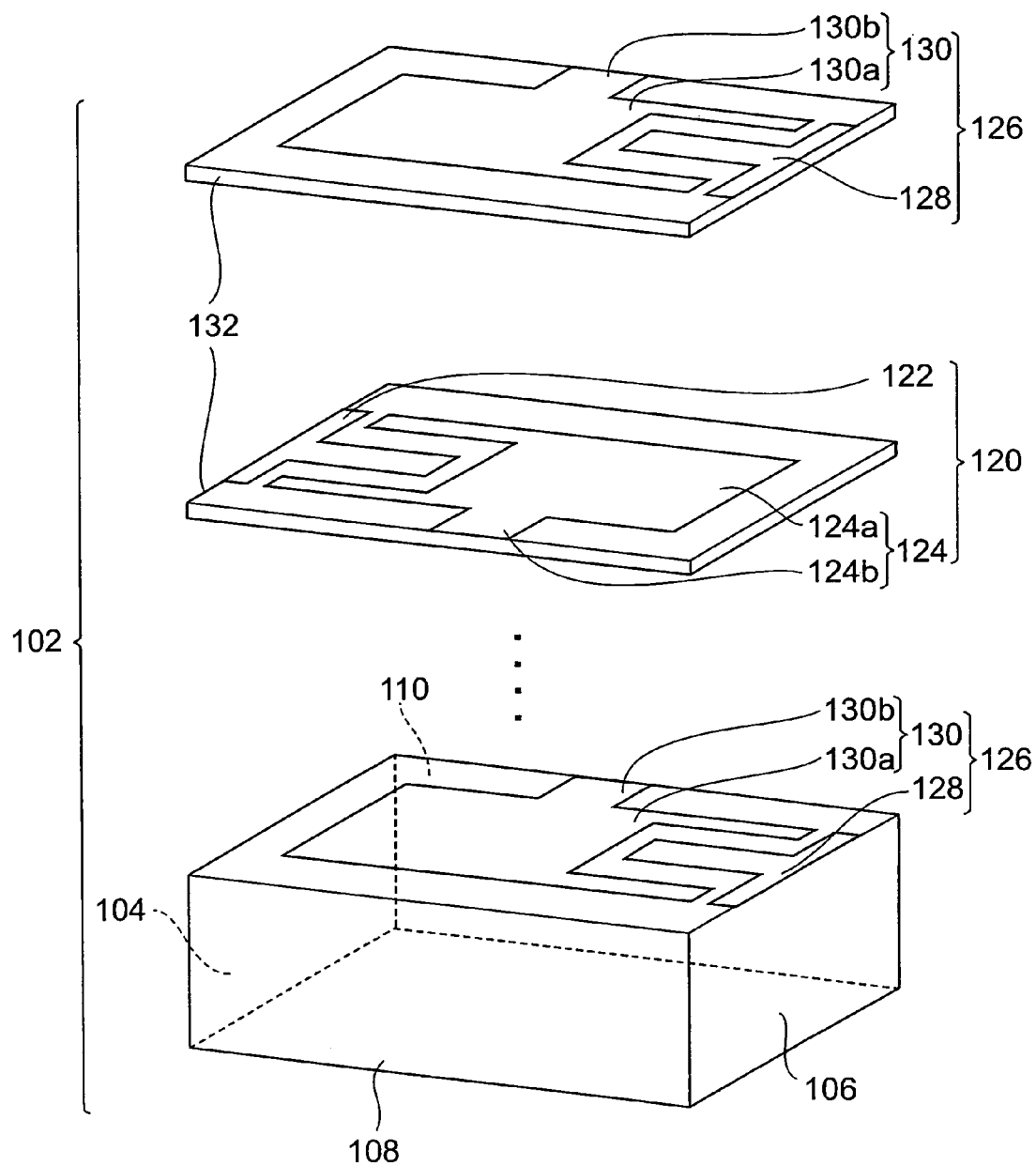
FIG. 23 is an exploded oblique perspective diagram showing a multilayer body included in a multilayer capacitor according to a second modification of the second embodiment.
Figure 24:
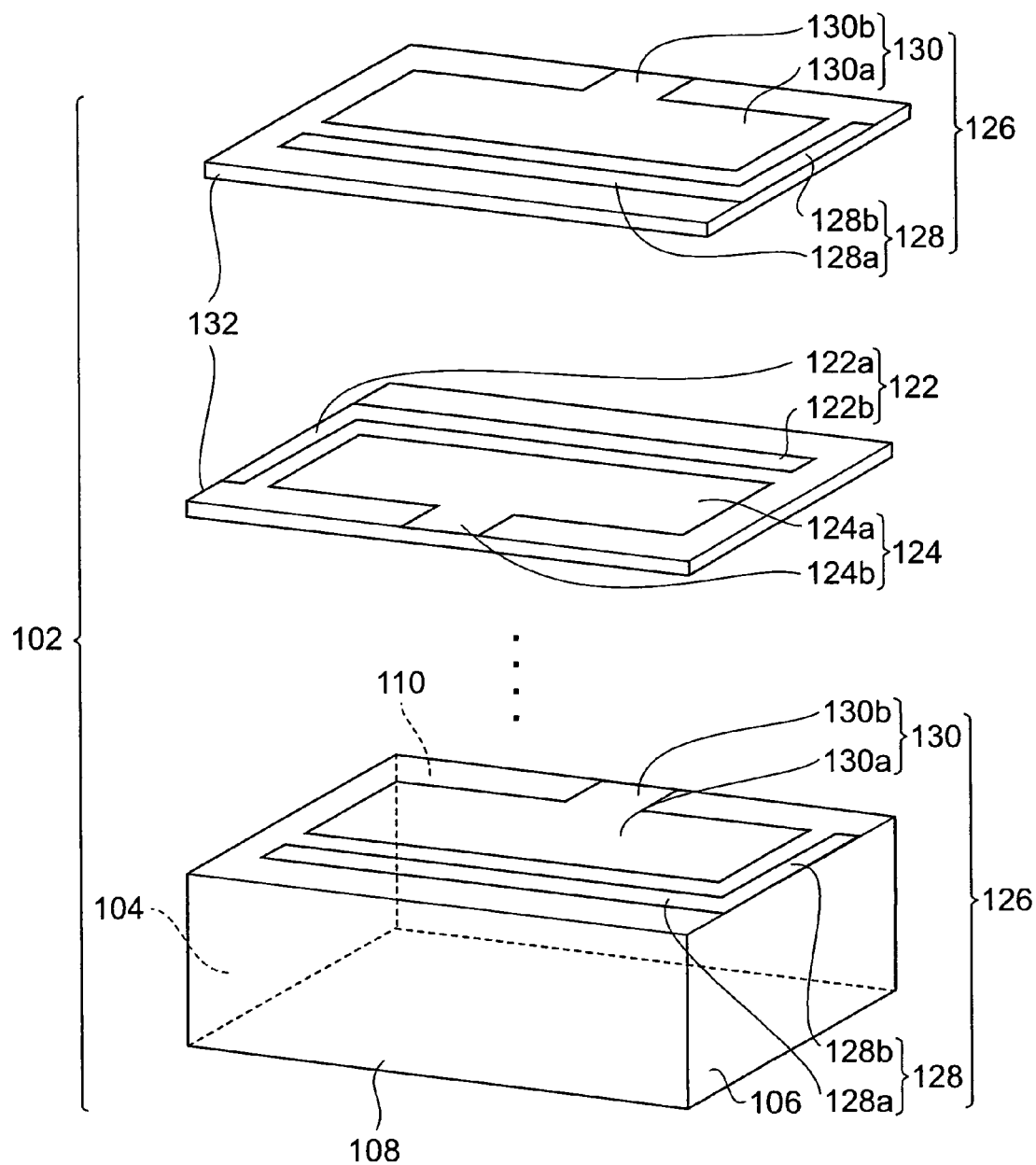
FIG. 24 is an exploded oblique perspective diagram showing a multilayer body included in a multilayer capacitor according to a third modification of the second embodiment.

FIG. 23 and FIG. 24 show modifications in which the shapes and surface areas of the first to fourth internal electrodes 122, 124, 128 and 130 are varied in accordance with the capacitance required in the first to third capacitance components $C_1$, $C_2$ and $C_3$.

FIG. 23 is an exploded oblique perspective diagram showing a multilayer body included in a multilayer capacitor according to a second modification of the second embodiment. A portion of the multilayer body is shown exploded in FIG. 23. As shown in FIG. 23, the end of the first electrode portion 124a on the side of the first side face 104 and the end of the first electrode portion 130a on the side of the second side face 106 are formed in such a manner that they are divided into two legs respectively. In this case, the first and third internal electrodes 122 and 128 respectively have a region of narrow width in the opposing direction in which the third side face 108 and the fourth side face 110 oppose each other, and these regions of narrow width may be formed in such a manner that they are positioned respectively between the two legs of the first electrode portions 124a and 130a, when viewed in the opposing direction in which the third side face 108 and the fourth side face 110 oppose each other. Accordingly, the narrow regions of the first and third internal electrodes 122 and 128 are surrounded respectively by the first electrode portions 124a and 130a.

FIG. 24 is an exploded oblique perspective diagram showing a multilayer body included in a multilayer capacitor according to a third modification of the second embodiment. A portion of the multilayer body is shown exploded in FIG. 24. As shown in FIG. 24, the first and third internal electrodes 122 and 128 respectively may have first electrode portions 122a and 128a which extend in the opposing direction in which the third side face 108 and the fourth side face 110 oppose each other, and second electrode portions 122b and 128b, which extend in the opposing direction in which the first side face 104 and the second side face 106 oppose each other, in such a manner that those second electrode portions 122b and 128b are extracted respectively to the first and second side faces 104 and 106. The second electrode portions 122b and 128b may be made narrower in width in the opposing direction in which the first side face 104 and the second side face 106 oppose each other, so as to correspond to the first electrode portions 122a and 128a.

Preferred embodiments of the present invention were described above, but the present invention is not limited to the aforementioned embodiments and modifications, and various modifications are possible. For example, in addition to the modification of the first embodiment (FIG. 11 to FIG. 13), and the modifications of the second embodiment (FIG. 23 and FIG. 24), it is also possible to change the shapes and surface ares of the first to fourth internal electrodes 12, 122, 24, 124, 28, 128, 30 and 130, appropriately, in accordance with the capacitance required in the first to third capacitance components $C_1$, $C_2$ and $C_3$. Therefore, the shapes of the first to fourth internal electrodes 12, 122, 24, 124, 28, 128, 30 and 130 are not limited to the shapes described in the aforementioned embodiments and modifications. Furthermore, the first terminal electrode 12, 112 and the second terminal electrode 14, 114 may be formed as an integrated body and electrically connected to each other.

From the invention thus described, it will be obvious that the invention may be varied in many ways. Such variations are not to be regarded as a departure from the spirit and scope of the invention, and all such modification as would be obvious to one skilled in the art are intended for inclusion within the scope of the following claims.

What is claimed is:

1. A multilayer capacitor, comprising:
a multilayer body in which a first internal electrode layer and a second internal electrode layer are laminated alternately with a dielectric layer interposed;
a first terminal electrode disposed on a first side face of said multilayer body parallel to a laminating direction in which said first and second internal electrode layers are laminated;
a second terminal electrode disposed on a second side face of said multilayer body opposing said first side face;
a third terminal electrode disposed on a third side face of said multilayer body, which is parallel to said laminating direction and extends in a direction that intersects with said first and second side faces; and
a fourth terminal electrode disposed on a fourth side face of said multilayer body opposing said third side face;
wherein said first internal electrode layer comprises a first internal electrode which extends so as to be extracted to said first side face and is connected to said first terminal electrode, and a second internal electrode, electrically insulated from said first internal electrode, which extends so as to be extracted to said third side face and is connected to said third terminal electrode;

wherein said second internal electrode layer comprises a third internal electrode which extends so as to be extracted to said second side face and is connected to said second terminal electrode, and a fourth internal electrode, electrically insulated from said third internal electrode, which extends so as to be extracted to said fourth side face and is connected to said fourth terminal electrode;

wherein a first capacitance component being formed by said second internal electrode and said fourth internal electrode;

wherein a second capacitance component being formed by said first internal electrode and said fourth internal electrode; and wherein a third capacitance component being formed by said second internal electrode and said third internal electrode.

2. The multilayer capacitor according to claim 1, wherein said first internal electrode of said first internal electrode layer also extends so as to be extracted to said second side face and is electrically connected to said second terminal electrode; and wherein said third internal electrode of said second internal electrode layer also extends so as to be extracted to said first side face and is electrically connected to said first terminal electrode.

3. The multilayer capacitor according to claim 2, wherein the respective both end portions of said first and third internal electrodes in an opposing direction in which said first side face and said second side face oppose each other are set to have a broader width in a direction perpendicular to said laminating direction and said opposing direction than the respective intermediate portions of said first and third internal electrodes in said opposing direction.

4. A multilayer capacitor, comprising:

a multilayer body in which a first internal electrode layer and a second internal electrode layer are laminated alternately with a dielectric layer interposed;

a first terminal electrode disposed on a first side face of said multilayer body parallel to a laminating direction in which said first and second internal electrode layers are laminated;

a second terminal electrode disposed on a second side face of said multilayer body opposing said first side face;

a third terminal electrode disposed on a third side face of said multilayer body, which is parallel to said laminating direction and extends in a direction that intersects with said first and second side faces; and a fourth terminal electrode disposed on a fourth side face of said multilayer body opposing said third side face;

wherein said first internal electrode layer comprises a first internal electrode which extends so as to be extracted to said first and second side faces and is connected to said first and second terminal electrodes, and a second internal electrode, electrically insulated from said first internal electrode, which extends so as to be extracted to said third side face and is connected to said third terminal electrode;

wherein said second internal electrode layer comprises a third internal electrode which extends so as to be extracted to said first and second side faces and is connected to said first and second terminal electrodes, and a fourth internal electrode, electrically insulated from said third internal electrode, which extends so as to be extracted to said fourth side face and is connected to said fourth terminal electrode;

wherein a first capacitance component being formed by said second internal electrode and said fourth internal electrode;

wherein a second capacitance component being formed by said first internal electrode and said fourth internal electrode; and wherein a third capacitance component being formed by said second internal electrode and said third internal electrode.

5. The multilayer capacitor according to claim 4, wherein the respective both end portions of said first and third internal electrodes in an opposing direction in which said first side face and said second side face oppose each other are set to have a broader width in a direction perpendicular to said laminating direction and said opposing direction than the respective intermediate portions of said first and third internal electrodes in said opposing direction.

* * * * *